(12) United States Patent
Park et al.

(10) Patent No.: US 11,626,104 B2
(45) Date of Patent: Apr. 11, 2023

(54) USER SPEECH PROFILE MANAGEMENT

(71) Applicant: QUALCOMM Incorporated, San Diego, CA (US)

(72) Inventors: Soo Jin Park, San Diego, CA (US); Sunkuk Moon, San Diego, CA (US); Lae-Hoon Kim, San Diego, CA (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 17/115,158

(22) Filed: Dec. 8, 2020

(65) Prior Publication Data

US 2022/0180859 A1 Jun. 9, 2022

(51) Int. Cl.
| | |
|---|---|
| G10L 17/00 | (2013.01) |
| G10L 15/07 | (2013.01) |
| G06F 1/3231 | (2019.01) |
| G10L 15/04 | (2013.01) |
| G10L 15/16 | (2006.01) |

(52) U.S. Cl.
CPC ............ *G10L 15/07* (2013.01); *G06F 1/3231* (2013.01); *G10L 15/04* (2013.01); *G10L 15/16* (2013.01)

(58) Field of Classification Search
None
See application file for complete search history.

(56) References Cited

U.S. PATENT DOCUMENTS

| | | | |
|---|---|---|---|
| 6,424,946 B1 | 7/2002 | Tritschler et al. | |
| 8,630,854 B2 * | 1/2014 | Marvit | H04N 7/147 348/14.08 |
| 11,398,218 B1 * | 7/2022 | Haslam | G10L 13/00 |
| 2007/0185718 A1 * | 8/2007 | Di Mambro | G07C 9/37 704/270.1 |
| 2009/0006102 A1 * | 1/2009 | Kan | G10L 25/00 704/E11.001 |
| 2012/0253811 A1 | 10/2012 | Breslin et al. | |
| 2014/0172430 A1 * | 6/2014 | Rutherford | G06Q 20/20 704/273 |

(Continued)

OTHER PUBLICATIONS

International Search Report and Written Opinion—PCT/US2021/071617—ISA/EPO—dated Feb. 1, 2022.

(Continued)

*Primary Examiner* — Jakieda R Jackson
(74) *Attorney, Agent, or Firm* — Qualcomm Incorporated

(57) ABSTRACT

A device includes processors configured to determine, in a first power mode, whether an audio stream corresponds to speech of at least two talkers. The processors are configured to, based on determining that the audio stream corresponds to speech of at least two talkers, analyze, in a second power mode, audio feature data of the audio stream to generate a segmentation result. The processors are configured to perform a comparison of a plurality of user speech profiles to an audio feature data set of a plurality of audio feature data sets of a talker-homogenous audio segment to determine whether the audio feature data set matches any of the user speech profiles. The processors are configured to, based on determining that the audio feature data set does not match any of the plurality of user speech profiles, generate a user speech profile based on the plurality of audio feature data sets.

30 Claims, 17 Drawing Sheets

(56) References Cited

U.S. PATENT DOCUMENTS

| | | | |
|---|---|---|---|
| 2015/0317977 A1* | 11/2015 | Manjunath | G10L 13/033 |
| | | | 704/270 |
| 2017/0270930 A1* | 9/2017 | Ozmeral | G06F 3/167 |
| 2019/0392852 A1* | 12/2019 | Hijazi | H04N 21/2335 |
| 2020/0160845 A1* | 5/2020 | Lavilla | G10L 15/005 |
| 2020/0194006 A1 | 6/2020 | Grancharov et al. | |
| 2021/0375291 A1* | 12/2021 | Zeng | G06F 16/535 |

OTHER PUBLICATIONS

Fujita et al., "End-to-End Neural Diarization: Reformulating Speaker Diarization as Simple Multi-label Classification", IEEE/ACM Transactions on Audio, Speech, and Language Processing, 2019, pp. 1-11.

* cited by examiner

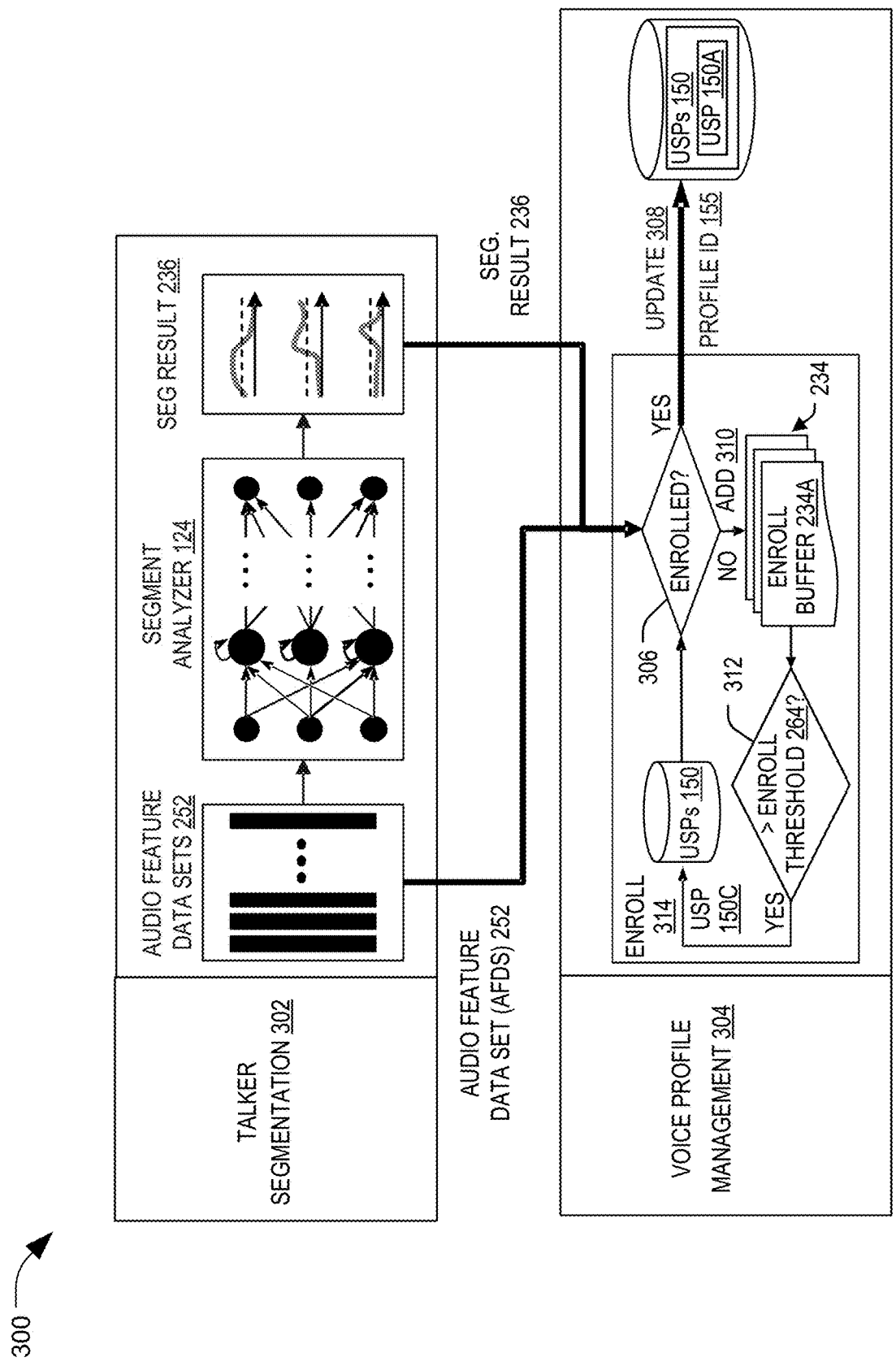

USER SPEECH PROFILE MANAGEMENT

I. FIELD

The present disclosure is generally related to management of user speech profiles.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to receive an audio signal from one or more microphones. For example, the audio signal may represent user speech captured by the microphones, external sounds captured by the microphones, or a combination thereof. Such devices may include applications that rely on user speech profiles, e.g., for user recognition. A user speech profile can be trained by having a user speak a script of predetermined words or sentences. Such active user enrollment to generate a user speech profile can be time-consuming and inconvenient.

III. SUMMARY

According to one implementation of the present disclosure, a device for audio analysis includes a memory and one or more processors. The memory is configured to store a plurality of user speech profiles of a plurality of users. The one or more processors are configured to determine, in a first power mode, whether an audio stream corresponds to speech of at least two distinct talkers. The one or more processors are also configured to, based on determining that the audio stream corresponds to speech of at least two distinct talkers, analyze, in a second power mode, audio feature data of the audio stream to generate a segmentation result. The segmentation result indicates talker-homogenous audio segments of the audio stream. The one or more processors are further configured to perform a comparison of the plurality of user speech profiles to a first audio feature data set of a first plurality of audio feature data sets of a first talker-homogenous audio segment to determine whether the first audio feature data set matches any of the plurality of user speech profiles. The one or more processors are also configured to, based on determining that the first audio feature data set does not match any of the plurality of user speech profiles: generate a first user speech profile based on the first plurality of audio feature data sets and add the first user speech profile to the plurality of user speech profiles.

According to another implementation of the present disclosure, a method of audio analysis includes determining, in a first power mode at a device, whether an audio stream corresponds to speech of at least two distinct talkers. The method also includes, based on determining that the audio stream corresponds to speech of at least two distinct talkers, analyzing, in a second power mode, audio feature data of the audio stream to generate a segmentation result. The segmentation result indicates talker-homogenous audio segments of the audio stream. The method further includes performing, at the device, a comparison of a plurality of user speech profiles to a first audio feature data set of a first plurality of audio feature data sets of a first talker-homogenous audio segment to determine whether the first audio feature data set matches any of the plurality of user speech profiles. The method also includes, based on determining that the first audio feature data set does not match any of the plurality of user speech profiles: generating, at the device, a first user speech profile based on the first plurality of audio feature data sets and adding, at the device, the first user speech profile to the plurality of user speech profiles.

According to another implementation of the present disclosure, a non-transitory computer-readable medium includes instructions that, when executed by one or more processors, cause the one or more processors to determine, in a first power mode, whether an audio stream corresponds to speech of at least two distinct talkers. The instructions, when executed by the one or more processors, also cause the processors to, based on determining that the audio stream corresponds to speech of at least two distinct talkers, analyze, in a second power mode, audio feature data of the audio stream to generate a segmentation result. The segmentation result indicates talker-homogenous audio segments of the audio stream. The instructions, when executed by the one or more processors, further cause the one or more processors to perform a comparison of a plurality of user speech profiles to a first audio feature data set of a first plurality of audio feature data sets of a first talker-homogenous audio segment to determine whether the first audio feature data set matches any of the plurality of user speech profiles. The instructions, when executed by the one or more processors, also cause the one or more processors to, based on determining that the first audio feature data set does not match any of the plurality of user speech profiles: generate a first user speech profile based on the first plurality of audio feature data sets and add the first user speech profile to the plurality of user speech profiles.

According to another implementation of the present disclosure, an apparatus includes means for storing a plurality of user speech profiles of a plurality of users. The apparatus also includes means for determining in a first power mode whether an audio stream corresponds to speech of at least two distinct talkers. The apparatus further includes means for analyzing in a second power mode audio feature data of the audio stream to generate a segmentation result. The audio feature data analyzed in the second power mode based on determining that the audio stream corresponds to speech of at least two distinct talkers. The segmentation result indicates talker-homogenous audio segments of the audio stream. The apparatus further includes means for performing a comparison of the plurality of user speech profiles to a first audio feature data set of a first plurality of audio feature data sets of a first talker-homogenous audio segment to determine whether the first audio feature data set matches any of the plurality of user speech profiles. The apparatus also includes means for generating a first user speech profile based on the first plurality of audio feature data sets. The first user speech profile is generated based on determining that the first audio feature data set does not match any of the plurality of user speech profiles. The apparatus further includes means for adding the first user speech profile to the plurality of user speech profiles.

Other aspects, advantages, and features of the present disclosure will become apparent after review of the entire

IV. BRIEF DESCRIPTION OF THE DRAWINGS

FIG. 3 is a diagram of an illustrative aspect of operations associated with user speech profile management, in accordance with some examples of the present disclosure.

V. DETAILED DESCRIPTION

Figure 1:
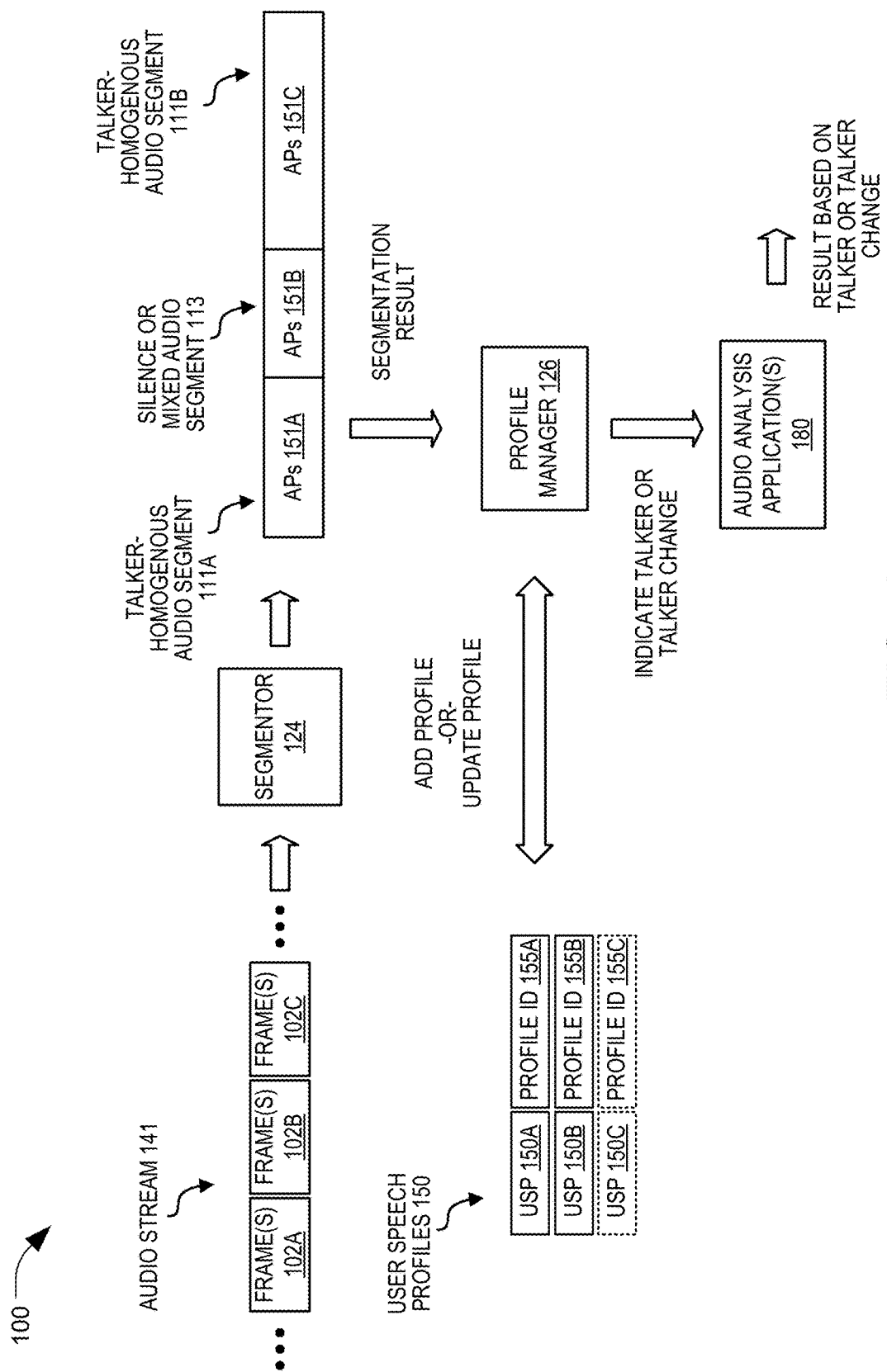
FIG. 1 is a block diagram of a particular illustrative example of user speech profile management, in accordance with some examples of the present disclosure.

Training a user speech profile using active user enrollment where the user speaks a set of predetermined words or sentences can be time-consuming and inconvenient. For example, the user has to plan ahead and take time to train the user speech profile. Systems and methods of user speech profile management disclosed herein enable distinguishing among multiple speakers without using active user enrollment. For example, an audio stream corresponding to speech of one or more users is received by a segmentor. The segmentor generates a segmentation result indicating talker-homogenous audio segments of the audio stream. As used herein, a "talker-homogenous audio segment" includes audio portions (e.g., audio frames) representing speech of the same talker. For example, the segmentation result identifies a set of audio frames that represent speech of the same talker. A profile manager compares audio features of an audio frame of the set of audio frames to determine whether the audio features match any of a plurality of stored user speech profiles. The profile manager, in response to determining that the audio features do not match any of the stored user speech profiles, generates a user speech profile based at least in part on the audio features. Alternatively, the profile manager, in response to determining that the audio features match a stored user speech profile, updates the stored user speech profile based at least in part on the audio features. The user speech profile can thus be generated or updated using passive enrollment, e.g., during a phone call or a meeting. The profile manager can also generate or update multiple user speech profiles during a conversation between multiple talkers. In a particular example, the profile manager provides a profile identifier of the generated or updated speech profile to one or more additional audio applications. For example, an audio application can perform speech-to-text conversion for the audio stream to generate a transcript with labels indicating talkers for corresponding text.

Particular aspects of the present disclosure are described below with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple frames are illustrated and associated with reference numbers 102A, 102B, and 102C. When referring to a particular one of these frames, such as the frame 102A, the distinguishing letter "A" is used. However, when referring to any arbitrary one of these frames or to these frames as a group, the reference number 102 is used without a distinguishing letter.

Figure 2A:
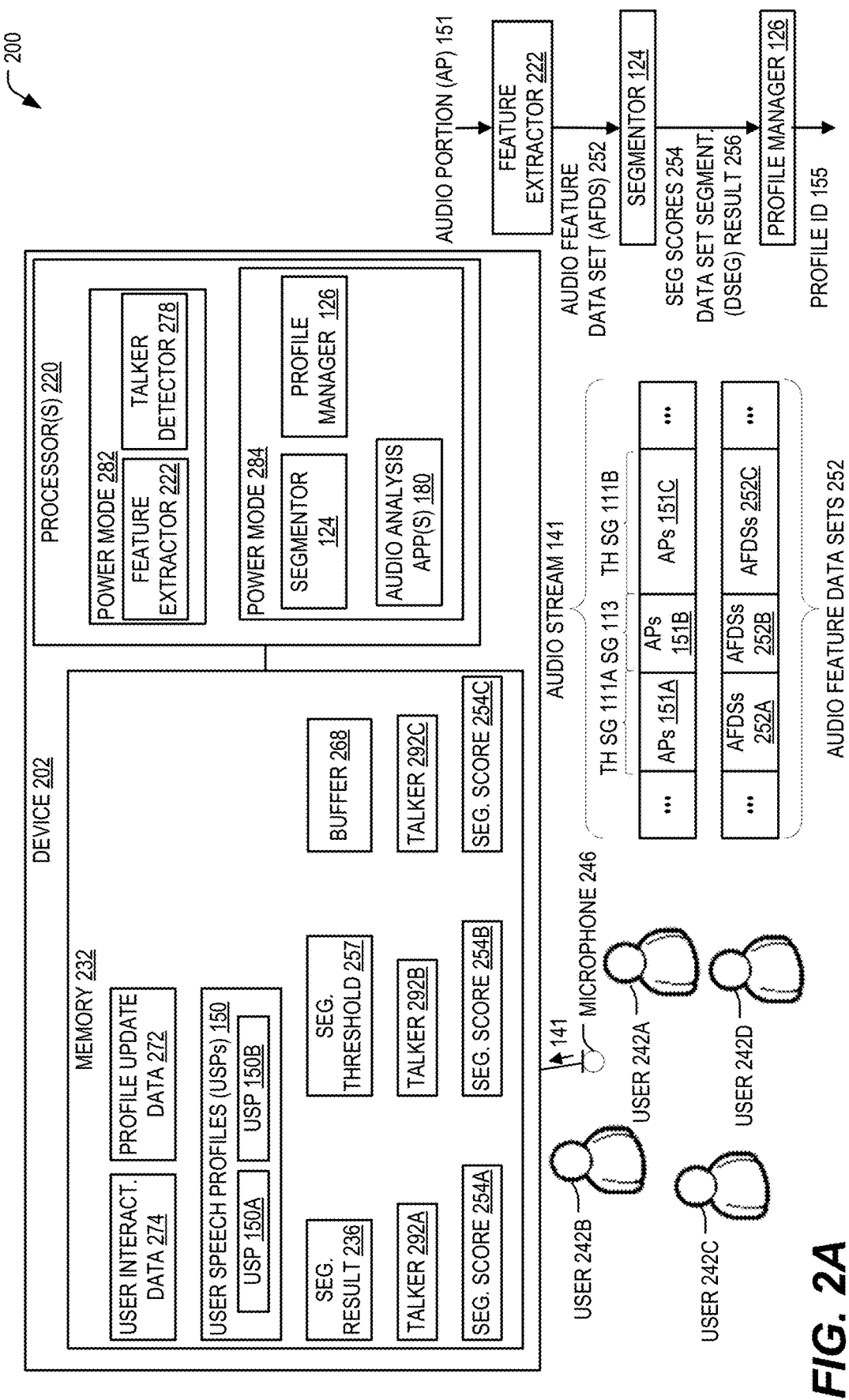
FIG. 2A is a diagram of a particular illustrative aspect of a system operable to perform user speech profile management, in accordance with some examples of the present disclosure.

As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 2A depicts a device 202 including one or more processors ("processor(s)" 220 of FIG. 2A), which indicates that in some implementations the device 202 includes a single processor 220 and in other implementations the device 202 includes multiple processors 220. For ease of reference herein, such features are generally introduced as "one or more" features and are subsequently referred to in the singular unless aspects related to multiple of the features are being described.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

FIG. 1 illustrates an example 100 of user speech profile management. In the example 100, a segmentor 124 and a profile manager 126 cooperate to process an audio stream 141 to distinguishing speech from multiple talkers without using active user enrollment of the talkers.

The audio stream 141 includes a plurality of discrete portions, represented as frames 102A, 102B, 102C in FIG. 1. In this example, each frame 102 represents or encodes a portion of the audio of the audio stream 141. To illustrate, each frame 102 may represent one half second of audio of the audio stream. In other examples, frames of different sizes or durations may be used.

The audio stream 141 is provided as input to the segmentor 124. The segmentor 124 is configured to divide the audio stream 141 into segments and identify each segment as containing speech from a single talker, speech from multiple talkers, or silence. For example, in FIG. 1, the segmentor 124 has identified a first set of audio portions 151A that together form a talker-homogeneous audio segment 111A. Similarly, the segmentor 124 has identified a second set of audio portions 151C that together form a second talker-homogeneous audio segment 111B. The segmentor 124 has also identified a set of audio portions 151B that together form a silence or mixed talker audio segment 113. The silence or mixed talker audio segment 113 represents sound that includes speech from multiple talker or includes no speech (e.g., silence or non-speech noise).

In a particular example, as described in more detail below, the segmentor 124 divides the audio stream 141 into segments by using one or more machine-learning segmentation models (e.g., neural networks) that are trained to perform speaker segmentation. In this example, no pre-enrollment of talkers is required. Rather the segmentor 124 is trained to distinguish between two or more previously unknown talkers by comparing talker characteristics between distinct audio frames of the audio stream 141. The specific number of talkers that the segmentor 124 can distinguish depends on the configuration and training of the machine-learning segmentation model(s). To illustrate, in a particular aspect, the segmentor 124 may be configured to distinguish between three talkers, in which case the machine-learning segmentation model(s) may include five output layers nodes corresponding to a Talker 1 output node, a Talker 2 output node, a Talker 3 output node, a silence output node, and a mixed output node. In this aspect, each output node is trained to generate as output a segmentation score that indicates the likelihood that a set of audio portions 151 being analyzed is associated with the respective output node. To illustrate, the Talker 1 output node generates a segmentation score indicate that the set of audio portions 151 represents speech of a first talker, the Talker 2 output node generates a segmentation score indicate that the set of audio portions 151 represents speech of a second talker, and so forth.

In a particular implementation, the machine-learning segmentation model(s) may include four output layer nodes when the segmentor 124 is configured to distinguish between three talkers. For example, the four output layer nodes include the Talker 1 output node, the Talker 2 output node, the Talker 3 output node, and the silence output node, and do not include a mixed output node. In this implementation, mixed speech is indicated by segmentation scores of multiple Talker output nodes indicating that the set of audio portions 151 represents speech of the corresponding talkers.

In a particular implementation, the machine-learning segmentation model(s) may include three output layer nodes when the segmentor 124 is configured to distinguish between three talkers. For example, the three output layer nodes include the Talker 1 output node, the Talker 2 output node, and the Talker 3 output node, and do not include a silence output node. In this implementation, silence is indicated by the segmentation score of each of the Talker output nodes indicating that the set of audio portions 151 does not represent speech of the corresponding talker. To illustrate, silence is indicated when the Talker 1 output node generates a segmentation score indicating that the set of audio portions 151 do not represent speech of a first talker, the Talker 2 output node generates a segmentation score indicating that the set of audio portions 151 do not represent speech of a second talker, and the Talker 3 output node generates a segmentation score indicating that the set of audio portions 151 do not represent speech of a third talker. In some aspects, as used herein "silence" can refer to "absence of speech," such as "non-speech noise."

Each of the audio portions 151 of a talker-homogeneous audio segment 111 includes multiple frames 102 of the audio stream 141. To illustrate, each of the audio portions 151A may include ten (10) audio frames 102 representing five (5) seconds of sound. In other examples, a different number of frames are included in each audio portion or the frames are of a different size such that each audio portion 151A represents more than or less than ten seconds of sound. Additionally, each talker-homogeneous audio segment 111 includes multiple audio portions 151. The number of audio portions 151 per talker-homogeneous audio segment 111 is variable. For example, a talker-homogeneous audio segment 111 may continue until speech of the talker is interrupted, such as by a period of silence (e.g., silence of a threshold duration) or by speech of another talker.

The segmentor 124 provides a segmentation result identifying the talker-homogeneous audio segments 111 to the profile manager 126. The profile manager maintains user speech profiles (USPs) 150 in a memory. Each user speech profile 150 is associated with a profile identifier (ID) 155. In a particular aspect, the profile IDs 155 and the user speech profiles 150 are generated by the profile manager 126 (e.g., the profile IDs 155 and the user speech profiles 150 are not based on user pre-enrollment).

In response to the segmentation result, the profile manager 126 compares audio portions 151 from a talker-homogenous audio segment 111 to the user speech profiles 150. If the audio portions 151 match (e.g., is sufficiently similar to) one of the user speech profiles 150, the profile manager 126 updates the user speech profile 150 based on the audio portions 151. For example, if the audio portions 151A of the talker-homogenous audio segment 111A are sufficiently similar to the user speech profile 150A, the profile manager 126 uses the audio portions 151A to update the user speech profile 150A.

If the audio portions 151 do not match any of the user speech profiles 150, the profile manager 126 adds a user speech profile 150 based on the audio portions 151. For example, in FIG. 1, the profile manager 126 generates the user speech profile 150C based on the audio portions 151C of the talker-homogenous audio segment 111C and assigns profile ID 155C to the user speech profile 150C.

The profile manager 126 also generates output indicating a talker or a talker change in the audio stream 141. For example, the output may include the profile ID 155 of the user speech profile 150 that matches the talker-homogenous audio segment 111. One or more audio analysis applications 180, which generate a result based on the talker or talker change. For example, the audio analysis applications 180 may transcribe detected speech to generate text, and may indicate in the text when a change in talkers occurs.

Referring to FIG. 2A, a particular illustrative aspect of a system configured to perform user speech profile management is disclosed and generally designated 200. The system 200 includes a device 202 that is coupled to a microphone 246. The device 202 is configured to perform user speech profile management using the segmentor 124 and the profile manager 126 of FIG. 1. In a particular aspect, the device 202 includes one or more processors 220 that include a feature extractor 222, the segmentor 124, the profile manager 126, a talker detector 278, the one or more audio analysis applications 180, or a combination thereof.

The feature extractor 222 is configured to generate audio feature data sets representing features of audio portions (e.g., audio frames) of an audio stream. The segmentor 124 is configured to indicate audio portions (or audio feature data sets) that represent speech of the same talker. The profile manager 126 is configured to generate (or update) user speech profiles based on the audio portions (or the audio feature data sets) that represent speech of the same talker. The talker detector 278 is configured to determine a count of talkers detected in the audio stream. In a particular implementation, the talker detector 278 is configured to activate the segmentor 124 in response to detecting multiple talkers in the audio stream. In this implementation, the segmentor 124 is bypassed when the talker detector 278 detects a single talker in the audio stream and the profile manager 126 generates (or updates) a user speech profile corresponding to the single talker. In a particular implementation, the one or more audio analysis applications 180 are configured to perform audio analysis based on the user speech profiles.

In a particular aspect, the device 202 includes a memory 232 coupled to the one or more processors 220. In a particular aspect, the memory 232 includes one or more buffers, such as a buffer 268. The memory 232 is configured to store one or more thresholds, such as a segmentation threshold 257 ("Seg. Threshold" in FIG. 2A). In a particular aspect, the one or more thresholds are based on user input, configuration settings, default data, or a combination thereof.

In a particular aspect, the memory 232 is configured to store data generated by the feature extractor 222, the talker detector 278, the segmentor 124, the profile manager 126, the one or more audio analysis applications 180, or a combination thereof. For example, the memory 232 is configured to store a plurality of user speech profiles 150 of a plurality of users 242, a segmentation result 236 ("Seg. Result" in FIG. 2A), audio feature data sets 252, an audio portion 151, segmentation scores 254 ("Seg. Scores" in FIG. 2A), a data set segmentation result 256 ("Data Set Seg. Result" in FIG. 2A), a profile ID 155, or a combination thereof. The memory 232 is configured to store profile update data 272, user interaction data 274 ("User Interact. Data" in FIG. 2A), or a combination thereof.

The device 202 is configured to receive an audio stream 141, via a modem, a network interface, an input interface, or from the microphone 246. In a particular aspect, the audio stream 141 includes one or more audio portions 151. For example, the audio stream 141 may be divided into a set of audio frames that correspond to the audio portions 151, with each audio frame representing a time-windowed portion of the audio stream 141. In other example, the audio stream 141 may be divided in another manner to generate the audio portions 151. Each audio portion 151 of the audio stream 141 includes or represents silence, speech from one or more of the users 242, or other sounds. A set of audio portions 151 that represents speech from a single user is referred to as a talker-homogenous audio segment 111. Each talker-homogenous audio segment 111 includes a plurality of audio portions 151 (e.g., a plurality of audio frames). In a particular aspect, a talker-homogenous audio segment 111 includes at least a threshold count of audio frames (e.g., 5 audio frames). In a particular aspect, the talker-homogenous audio segment 111 includes a consecutive set of audio portions 151 corresponding to speech of the same user. In a particular aspect, the consecutive set of audio portions 151 may include one or more subsets of audio portions 151 with each subset corresponding to less than threshold silence indicative of natural short pauses in speech.

The audio stream 141 can include various combinations of talker-homogenous audio segments, audio segments corresponding to silence, audio segments corresponding to multiple talkers, or a combination thereof. As one example, in FIG. 2A, the audio stream 141 includes audio portions 151A of a talker-homogenous audio segment 111A corresponding to speech of the user 242A, audio portions 151B of an audio segment 113 corresponding to silence (or non-speech noise), and audio portions 151C of a talker-homogenous audio segment 111B corresponding to speech of the user 242B. In other examples, the audio stream 114 includes a different set or arrangement of audio segments. Although an audio portion is described as referring to an audio frame, in other implementations an audio portion refers to a portion of an audio frame, multiple audio frames, audio data corresponding to a particular speech or playback duration, or a combination thereof.

The feature extractor 222 is configured to extract (e.g., determine) audio features of the audio stream 141 to generate audio feature data sets 252. For example, the feature extractor 222 is configured to extract audio features of an audio portion 151 of the audio stream 141 to generate an audio feature data set (AFDS) 252. In a particular aspect, the audio feature data set 252 includes an audio feature vector, such as an embedding vector. In a particular aspect, the audio feature data set 252 indicates mel-frequency cepstral coefficients (MFCCs) of the audio portion 151. In a particular example, the feature extractor 222 generates one or more audio feature data sets 252A by extracting audio features of the audio portions 151A. The feature extractor 222 generates one or more audio feature data sets 252B by extracting audio features of the audio portions 151B. The feature extractor 222 generates one or more audio feature data sets 252C by extracting audio features of the audio portions 151C. The audio feature data sets 252 include the one or more audio feature data sets 252A, the one or more audio feature data sets 252B, the one or more audio feature data sets 252C, or a combination thereof.

In an illustrative example, the feature extractor 222 extracts audio features of each frame of the audio stream 141 and provides the audio features of each frame to the segmentor 124. In a particular aspect, the segmentor 124 is configured to generate a set of segmentation scores (e.g., segmentation scores 254) for audio features of a particular number of audio frames (e.g., 10 audio frames). For example, an audio portion 151 includes the particular number of audio frames (e.g., 10 audio frames). The audio features of the particular number of audio frames (e.g., that are used by the segmentor 124 to generate a particular set of segmentation scores) correspond to an audio feature data set 252. For example, the feature extractor 222 extracts first audio features of a first audio frame, second audio features of a second audio frame, and so on including tenth audio features of a tenth audio frame. The segmentor 124 generates first segmentation scores 254 based on the first audio features, the second audio features, and so on, including the tenth audio features. For example, the first audio features, the second audio features, and up to the tenth audio features correspond to a first audio feature data set 252. Similarly, the feature extractor 222 extracts eleventh audio features of an eleventh audio frame, twelfth audio features of a twelfth audio frame, and so on including twentieth audio features of a twentieth audio frame. The segmentor 124 generates second segmentation scores 254 based on the eleventh audio features, the twelfth audio features, and so on, including the twentieth audio features. For example, the eleventh audio features, the twelfth audio features, and up to the twentieth audio features correspond to a second audio feature data set 252. It should be understood that generating a set of segmentation scores based on ten audio frames is provided as an illustrative example. In other examples, the segmentor 124 generates the set of segmentation scores based on fewer than ten or more than ten audio frames. For example, an audio portion 151 includes fewer than ten or more than ten audio frames.

The segmentor 124 is configured to generate a set of segmentation scores (e.g., segmentation scores 254) for each audio feature data set. For example, in response to input of an audio feature data set 252 to the segmentor 124, the segmentor 124 generates multiple segmentation scores 254. The number of segmentation scores 254 generated in response to an audio feature data set 252 depends on the number of talkers that the segmentor 124 is trained to distinguish. As one example, the segmentor 124 is configured to distinguish speech of K distinct talkers by generating a set of K segmentation scores 254. In this example, each segmentation score 254 indicates a probability that the audio feature data set input to the segmentor 124 represents speech of a corresponding talker. To illustrate, K equals three (3) when the segmentor 124 is configured to distinguish speech of three (3) different talkers, such as a talker 292A, a talker 292B, and a talker 292C. In this illustrative example, the segmentor 124 is configured to output three (3) segmentation scores 254, such as a segmentation score 254A, a segmentation score 254B, and a segmentation score 254C, for each audio feature data set 252 input to the segmentor 124. In this illustrative example, the segmentation score 254A indicates a probability that the audio feature data set 252 represents speech of the talker 292A, the segmentation score 254B indicates a probability that the audio feature data set 252 represents speech of the talker 292B, and the segmentation score 254C indicates a probability that the audio feature data set 252 represents speech of the talker 292C. In other examples, the count of talkers that the segmentor 124 is configured to distinguish (K in the examples above), is greater than three or less than three.

The talkers 292 correspond to a set of talkers that have been detected most recently, e.g., during a segmentation window, by the segmentor 124. In a particular aspect, the talkers 292 do not have to be pre-enrolled in order to be distinguished by the segmentor 124. The segmentor 124 enables passive enrollment of multiple users by distinguishing between speech of multiple users that are not pre-enrolled. The segmentation window includes up to a particular count of audio portions (e.g., 20 audio frames), audio portions processed by the segmentor 124 during a particular time window (e.g., 20 milliseconds), or audio portions corresponding to a particular speech duration or playback duration.

In the example illustrated in FIG. 2A, the audio feature data sets 252 representing features of the audio portions 151 of the audio stream 141 may be provided as input to the segmentor 124. In this example, the audio feature data sets 252 represent speech of two or more of users 242, such as audio feature data sets 252A representing speech of the user 242A, audio feature data sets 252B representing silence, and audio feature data set 252C representing speech of the user 242B. In a particular implementation, the segmentor 124 has no prior information about the users 242. For example, the users 242 have not pre-enrolled with the device 202. In response to input of an audio feature data set 252, the segmentor 124 outputs a segmentation score 254A, a segmentation score 254B, and a segmentation score 254C. Each segmentation score 254 indicates a probability that the audio feature data set 252 represents speech of a respective talker 292, and each of the segmentation scores 254 is compared to a segmentation threshold 257. If one of the segmentation scores 254 for the audio feature data set 252 satisfies the segmentation threshold 257, speech of the corresponding talker 292 is indicated as detected in the audio feature data set 252. To illustrate, if the segmentation score 254A for the audio feature data set 252 satisfies the segmentation threshold 257, speech of the talker 292A is indicated as detected in the audio feature data set 252 (and the audio portion 151 represented by the audio feature data set 252). A similar operation is performed for each of the audio feature data sets 252A, the audio feature data sets 252B, and the audio feature data sets 252C.

The segmentor 124 uses a talker 292 as a placeholder for an unknown user (such as a user 242 who is unknown to the segmentor 124 as associated with speech represented by an audio feature data set 252) during the segmentation window. For example, the audio feature data sets 252A correspond to speech of a user 242A. The segmentor 124 generates the segmentation score 254A for each of the audio feature data sets 252A that satisfies the segmentation threshold 257 to indicate that the audio feature data sets 252A correspond to speech of the talker 292A (e.g., a placeholder for the user 242A). As another example, the audio feature data sets 252C correspond to speech of a user 242B. The segmentor 124 generates the segmentation score 254B for each of the audio feature data sets 252C that satisfies the segmentation threshold 257 to indicate that the audio feature data sets 252C correspond to speech of the talker 292B (e.g., a placeholder for the user 242B).

In a particular implementation, the segmentor 124 may reuse the talker 292A (e.g., the segmentation score 254A) as a placeholder for another user (e.g., a user 242C) when speech of the talker 292A (e.g., the user 242A) has not been detected for a duration of the segmentation window, e.g., a threshold duration has expired since detecting previous speech associated with the talker 292A. The segmentor 124 can distinguish speech associated with more than the predetermined count of talkers (e.g., more than K talkers) in the audio stream 141 by reusing a talker placeholder for another user when a previous user associated with the talker placeholder has not spoken during a segmentation window. In a particular implementation, the segmentor 124, in response to determining that speech of each of the talker 292A (e.g., the user 242A), the talker 292B (e.g., the user 242B), and the talker 292C (e.g., the user 242C) is detected within the segmentation window and determining that speech associated with another user (e.g., a user 242D) is detected, re-uses a talker placeholder (e.g., the talker 292A) based on determining that speech of the talker 292A (e.g., the user 242A) was detected least recently.

In a particular aspect, the segmentor 124 includes or corresponds to a trained machine-learning system, such as a neural network. For example, analyzing the audio feature data sets 252 includes applying a speaker segmentation neural network (or another machine-learning-based system) to the audio feature data sets 252.

In a particular aspect, the segmentor 124 generates a data set segmentation result 256 based on the segmentation scores 254. The data set segmentation result 256 indicates the talkers 292 (if any) that are detected in an audio portion 151. For example, the data set segmentation result 256 output by the segmentor 124 indicates that speech of a talker 292 is detected in response to determining that a segmentation score 254 for the talker 292 satisfies (e.g., is greater than) the segmentation threshold 257. To illustrate, when the segmentation score 254A of an audio feature data set 252 satisfies the segmentation threshold 257, the segmentor 124 generates the data set segmentation result 256 (e.g., "1") for the audio feature data set 252 indicating that speech of the talker 292A is detected in the audio portion 151. In another example, when each of the segmentation score 254A and the segmentation score 254B of the audio feature data set 252 satisfies the segmentation threshold 257, the segmentor 124 generates the data set segmentation result 256 (e.g., "1, 2") for the audio feature data set 252 to indicate that speech of the talker 292A and the talker 292B (e.g., multiple talkers) is detected in the audio portion 151. In a particular example, when each of the segmentation score 254A, the segmentation score 254B, and the segmentation score 254C for the audio feature data set 252 fails to satisfy the segmentation threshold 257, the segmentor 124 generates the data set segmentation result 256 (e.g., "0") for the audio feature data set 252 to indicate that silence (or non-speech audio) is detected in the audio portion 151. The segmentation result 236 for the audio portion 151 (or the audio feature data set 252) includes the segmentation scores 254, the data set segmentation result 256, or both, for the audio portion 151 (or the audio feature data set 252).

The segmentor 124 is configured to provide the segmentation result 236 for the audio portion 151 (e.g., the audio feature data set 252) to the profile manager 126. The profile manager 126 is configured to, in response to determining that the audio feature data set 252 does not match any of the plurality of user speech profiles 150, generate a user speech profile 150 based at least in part on the audio feature data set 252. In a particular aspect, the profile manager 126 is configured to generate the user speech profile 150 based on a talker-homogenous audio segment 111. For example, the profile manager 126 is configured to generate a user speech profile 150A for the talker 292A (e.g., placeholder for the user 242A) based on the audio feature data segments 152A of the talker-homogenous audio segment 111A. The user speech profile 150A represents (e.g., models) speech of the user 242A. Alternatively, the profile manager 126 is configured to, in response to determining that the audio feature data set 252 matches a user speech profile 150, update the user speech profile 150 based on the audio feature data set 252. For example, the profile manager 126 is configured to update the user speech profile 150A that represents the speech of the user 242A based on subsequent audio portions that match the user speech profile 150A independently of which talker 292 is used as a placeholder for the user 242A for the subsequent audio portions. In a particular aspect, the profile manager 126 outputs a profile ID 155 of the user speech profile 150 responsive to generating or updating the user speech profile 150.

In a particular implementation, the talker detector 278 is configured to determine a count of talkers detected in the audio stream 141 based on audio features extracted from the audio stream 141. In a particular aspect, the talker detector 278 determines the count of talkers based on the audio feature data sets 252 extracted by the feature extractor 222. For example, the audio features used by the talker detector 278 to determine the count of talkers can be the same as the audio features used by the segmentor 124 to generate the segmentation result 236 and used by the profile manager 126 to generate or update the user speech profiles 150. In an alternative aspect, the talker detector 278 determines the count of talkers based on audio features extracted by a second feature extractor that is distinct from the feature extractor 222. In this aspect, the audio features used by the talker detector 278 to determine the count of talkers can be distinct from the audio features used by the segmentor 124 to generate the segmentation result 236 and used by the profile manager 126 to generate or update the user speech profiles 150. In a particular aspect, the talker detector 278 activates the segmentor 124 in response to detecting at least two distinct talkers in the audio stream 141. For example, the segmentor 124 processes the audio feature data sets 252 when multiple talkers are detected in the audio stream 141. Alternatively, when the talker detector 278 detects speech of a single talker in the audio stream 141, the segmentor 124 is bypassed and the profile manager 126 processes the audio feature data sets 252 to generate or update a user speech profile 150.

In some implementations, the device 202 corresponds to or is included in one or various types of devices. In an illustrative example, the one or more processors 220 are integrated in a headset device that includes the microphone 246, such as described further with reference to FIG. 13. In other examples, the one or more processors 220 are integrated in at least one of a mobile phone or a tablet computer device, as described with reference to FIG. 12, a wearable electronic device, as described with reference to FIG. 14, a voice-controlled speaker system, as described with reference to FIG. 15, or a virtual reality headset or an augmented reality headset, as described with reference to FIG. 16. In another illustrative example, the one or more processors 220 are integrated into a vehicle that also includes the microphone 246, such as described further with reference to FIG. 17 and FIG. 18.

During operation, the one or more processors 220 receive an audio stream 141 corresponding to speech of one or more users 242 (e.g., a user 242A, a user 242B, a user 242C, a user 242D, or a combination thereof). In a particular example, the one or more processors 220 receive the audio stream 141 from the microphone 246 that captured the speech of the one or more users. In another example, the audio stream 141 corresponds to an audio playback file stored in the memory 232, and the one or more processors 220 receive the audio stream 141 from the memory 232. In a particular aspect, the one or more processors 220 receive the audio stream 141 via an input interface or a network interface (e.g., a network interface of a modem) from another device.

During a feature extraction stage, the feature extractor 222 generates audio feature data sets 252 of the audio stream 141. For example, the feature extractor 222 generates the audio feature data sets 252 by determining features of audio portions 151 of the audio stream 141. In a particular example, the audio stream 141 includes audio portions 151A, audio portions 151B, audio portions 151C, or a combination thereof. The feature extractor 222 generates the audio feature data sets 252A representing features of the audio portions 151A, audio feature data sets 252B representing features of the audio portions 151B, and audio feature data sets 252C representing features of the audio portions 151C, or a combination thereof. For example, the feature extractor 222 generates an audio feature data set 252 (e.g., a feature vector) for an audio portion 151 (e.g., an audio frame) by extracting audio features of the audio portion 151.

During a segmentation stage, the segmentor 124 analyzes the audio feature data sets 252 to generate a segmentation result 236. For example, the segmentor 124 analyzes the audio feature data set 252 (e.g., a feature vector) of the audio portion 151 (e.g., an audio frame) to generate segmentation scores 254 for the audio portion 151. To illustrate, the segmentation scores 254 includes a segmentation score 254A (e.g., 0.6) indicating a likelihood that the audio portion 151 corresponds to speech of a talker 292A. The segmentation scores 254 also include a segmentation score 254B (e.g., 0) and a segmentation score 254C (e.g., 0) indicating a likelihood of the audio portion 151 corresponding to speech of a talker 292B and a talker 292C, respectively. In a particular aspect, the segmentor 124, in response to determining that the segmentation score 254A satisfies the segmentation threshold 257 and each of the segmentation score 254B and the segmentation score 254C fails to satisfy the segmentation threshold 257, generates a data set segmentation result 256 indicating that the audio portion 151 corresponds to speech of the talker 292A and does not correspond to speech of either the talker 292B or the talker 292C. The segmentor 124 generates a segmentation result 236 indicating the segmentation scores 254, the data set segmentation result 256, or both, for the audio portion 151.

In a particular example, during the segmentation stage, the segmentor 124, in response to determining that each of multiple segmentation scores (e.g., the segmentation score 254A and the segmentation score 254B) satisfy the segmentation threshold 257, generates a segmentation result 236 indicating that the audio portion 151 corresponds to speech of multiple talkers (e.g., the talker 292A and the talker 292B).

Figure 2B:
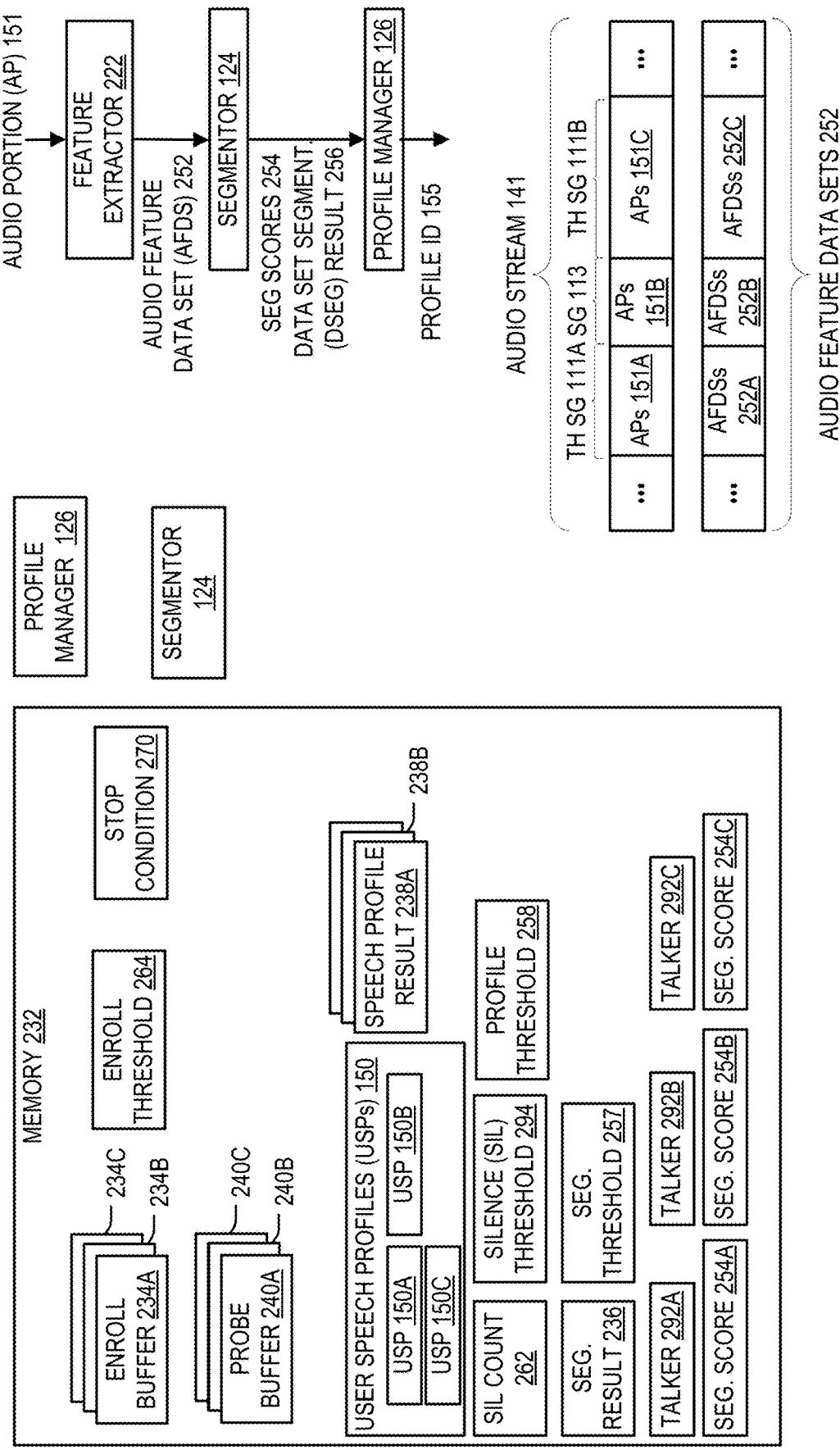
FIG. 2B is a diagram of illustrative components of the system of FIG. 2A, in accordance with some examples of the present disclosure.

The profile manager 126 processes the audio portion 151 (e.g., the audio feature data set 252) based on the segmentation result 236, as further described with reference to FIG. 2B. In FIG. 2B, the memory 232 includes enroll buffers 234, probe buffers 240, or a combination thereof. For example, the memory 232 includes an enroll buffer 234 and a probe buffer 240 designated for each of the talkers 292. To illustrate, the memory 232 includes an enroll buffer 234A and a probe buffer 240A designated for the talker 292A, an enroll buffer 234B and a probe buffer 240B designated for the talker 292B, and an enroll buffer 234C and a probe buffer 240C designated for the talker 292C. The memory 232 is configured to store an enroll threshold 264, a profile threshold 258, a silence threshold 294, or a combination thereof. The memory 232 is configured to store data indicating a stop condition 270, a speech profile result 238, a silence count 262 ("Sil Count" in FIG. 2B), or a combination thereof.

The profile manager 126 is configured to, during a profile check stage, determine whether the audio feature data set 252 matches an existing user speech profile 150. In a particular aspect, the profile manager 126 uses the same audio features for the comparison with or update of the user speech profiles 150 as the audio features used by the segmentor 124 to generate the segmentation result 236. In another aspect, the profile manager 126 uses second audio features for the comparison with or update of the user speech profiles 150 that are distinct from first audio features used by the segmentor 124 to generate the segmentation result 236.

In a particular implementation, the profile manager 126 is configured to collect audio feature data sets 252 corresponding to the same talker in a probe buffer 240 prior to comparing with the user speech profiles 150 to improve accuracy of the comparison. If the audio feature data set 252 matches an existing user speech profile, the profile manager 126 is configured to, during an update stage, update the existing user speech profile based on the audio feature data set 252. If the audio feature data set 252 does not match an existing user speech profile, the profile manager 126 is configured to, during an enrollment stage, add the audio feature data set 252 to an enroll buffer 234 and, in response to determining that the audio feature data sets 252 stored in the enroll buffer 234 satisfy the enrollment threshold 264, generate a user speech profile 150 based on the audio feature data sets 252 stored in the enrollment buffer 234.

During the profile check stage, the profile manager 126, in response to determining that no user speech profiles are available and that the segmentation result 236 indicates that the audio portion 151 corresponds to speech of a talker (e.g., the talker 292A), adds the audio feature data set 252 to the enroll buffer 234 (e.g., the enroll buffer 234A) that is designated for the talker 292 and proceeds to an enrollment stage.

In a particular aspect, the profile manager 126, in response to determining that at least one user speech profile 150 is available, performs a comparison of the audio feature data set 252 with the at least one user speech profile 150 to determine whether the audio feature data set 252 matches any of the at least one user speech profile 150 The profile manager 126, in response to determining that at least one user speech profile 150 is available and that the segmentation result 236 indicates that the audio portion 151 corresponds to speech of a talker 292 (e.g., the talker 292A), adds the audio feature data set 252 to the probe buffer 240 (e.g., the probe buffer 240A) that is designated for the talker 292.

The profile manager 126 determines whether the audio feature data sets (e.g., including the audio feature data set 252) stored in the probe buffer 240 match any of the at least one user speech profile 150. For example, the profile manager 126 generates speech profile results 238 based on a comparison of the audio feature data sets (e.g., including the audio feature data set 252) of the probe buffer 240 (e.g., the probe buffer 240A) and each of the at least one user speech profile 150. To illustrate, the profile manager 126 generates a speech profile result 238A based on a comparison of the audio feature data sets (e.g., including the audio feature data set 252) of the probe buffer 240 (e.g., the probe buffer 240A) and a user speech profile 150A.

In a particular aspect, the profile manager 126, in response to determining that a single audio feature data set (e.g., the audio feature data set 252) is available in the probe buffer 240 (e.g., the probe buffer 240A), generates the speech profile result 238A based on a comparison of the single audio feature data set and the user speech profile 150A. Alternatively, the profile manager 126, in response to determining that multiple audio feature data sets (e.g., including the audio feature data set 252) are available in the probe buffer 240 (e.g., the probe buffer 240A), generates the speech profile result 238A based on comparisons of the multiple audio feature data sets and user speech profile 150A. For example, the profile manager 126 generates a first data set result based on a comparison of the audio feature data set 252 and the user speech profile 150A, a second data set result based on a comparison of a second audio feature data set of the probe buffer 240 and the user speech profile 150A, additional data set results based on comparisons of additional audio feature data sets of the probe buffer 240 and the user speech profile 150A, or a combination thereof. The profile manager 126 generates the speech profile result 238A based on (e.g., a weighted average of) the first data set result, the second data set result, the additional data set results, or a combination thereof. In a particular aspect, higher weights are assigned to data set results of audio feature data sets that are more recently added to the probe buffer 240.

The speech profile result 238A indicates a likelihood that the audio feature data sets match the user speech profile 150A. Similarly, the profile manager 126 generates a speech profile result 238B based on a comparison of the audio feature data sets (e.g., including the audio feature data set 252) of the probe buffer 240 (e.g., the probe buffer 240A) and a user speech profile 150B.

In a particular aspect, the profile manager 126 selects a speech profile result 238 that indicates a highest likelihood that the audio feature data set 252 matches the corresponding user speech profile 150. For example, the profile manager 126 selects the speech profile result 238A in response to determining that the speech profile result 238A indicates higher likelihood of a match than (e.g., is greater than or equal to) the speech profile result 238B. The profile manager 126, in response to determining that the speech profile result 238A (e.g., the speech profile result 238A indicating a highest likelihood of a match) satisfies (e.g., is greater than or equal to) the profile threshold 258, determines that the audio feature data sets stored in the probe buffer 240 (e.g., the probe buffer 240A) match the user speech profile 150A and proceeds to the update stage. Alternatively, the profile manager 126, in response to determining that the speech profile result 238A (e.g., the speech profile result 238A indicating a highest likelihood of a match) fails to satisfy (e.g., is less than) the profile threshold 258, determines that the audio feature data sets stored in the probe buffer 240 (e.g., the probe buffer 240A) do not match any of the user speech profiles 150 and proceeds to the enrollment stage.

During the update stage, the profile manager 126, in response to determining that the audio feature data set 252 matches a user speech profile 150 (e.g., the user speech profile 150A), updates the user speech profile 150 and outputs a profile ID 155 of the user speech profile 150. The profile manager 126 updates the user speech profile 150 (that matched the audio feature data sets stored in the probe buffer 240) based on the audio feature data sets stored in the probe buffer 240. The user speech profile 150A thus evolves over time to match changes in user speech.

During the enrollment stage, the profile manager 126, in response to determining that the segmentation result 236 indicates that the audio feature data set 252 represents speech of a talker 292 (e.g., the talker 292A), adds the audio feature data set 252 to an enroll buffer 234 (e.g., the enroll buffer 234A) corresponding to the talker 292. The profile manager 126 determines whether the audio feature data sets stored in the enroll buffer 234 satisfy the enroll threshold 264. In a particular aspect, the profile manager 126 determines that the audio feature data sets stored in the enroll buffer 234 satisfy the enroll threshold 264 in response to determining that a count of the audio feature data sets is greater than or equal to the enroll threshold 264 (e.g., 48 audio feature data sets). In another aspect, the profile manager 126 determines that the audio feature data sets stored in the enroll buffer 234 satisfy the enroll threshold 264 in response to determining that a speech duration (e.g., a playback duration) of the audio feature data sets is greater than or equal to the enroll threshold 264 (e.g., 2 seconds).

The profile manager 126, in response to determining that the audio feature data sets stored in the enroll buffer 234 fails to satisfy the enroll threshold 264, refrains from generating a user speech profile 150 based on the audio feature data sets stored in the enroll buffer 234 and continues to process subsequent audio portions of the audio stream 141. In a particular aspect, the profile manager 126 continues to add subsequent audio feature data sets representing speech of the talker 292 (e.g., the talker 292A) to the enroll buffer 234

(e.g., the enroll buffer 234A) until the stop condition 270 is satisfied. For example, the profile manager 126 determines that the stop condition 270 is satisfied in response to determining that the count of audio feature data sets (e.g., including the audio feature data set 252) stored in the enroll buffer 234 satisfies the enroll threshold 264, that longer than threshold silence is detected in the audio stream 141, or both, as described herein. To illustrate, the stop condition 270 is satisfied when enough audio feature data sets are in the enroll buffer 234 to generate a user speech profile or when the talker 292 appears to have stopped talking.

In a particular aspect, the profile manager 126, in response to determining that the audio feature data sets (e.g., including the audio feature data set 252) stored in the enroll buffer 234 satisfy the enroll threshold 264, generates a user speech profile 150C based on the audio feature data sets stored in the enroll buffer 234, resets the enroll buffer 234, adds the user speech profile 150C to the plurality of user speech profiles 150, outputs a profile ID 155 of the user speech profile 150C, and continues to process subsequent audio portions of the audio stream 141. The profile manager 126 thus generates the user speech profile 150C based audio feature data sets of audio portions corresponding to the same talker 292 (e.g., the talker 292A) that are stored in the enroll buffer 234 (e.g., the enroll buffer 234A) designated for the talker 292 (e.g., the talker 292A). Using multiple audio feature data sets to generate the user speech profile 150C improves accuracy of the user speech profile 150A in representing the speech of the talker 292A (e.g., the user 242A). The segmentor 124 and the profile manager 126 thus enable passive enrollment of multiple users by generating user speech profiles for users that do not have to be pre-enrolled and do not have to speak pre-determined words or sentences for user speech profile generation.

In a particular aspect, audio portions corresponding to multiple talkers are skipped or disregarded for generating or updating user speech profiles 150. For example, the profile manager 126, in response to determining that the segmentation result 236 indicates that the audio portion 151 corresponds to speech of multiple talkers, disregards the audio feature data set 252 of the audio portion 151 and continues to process subsequent audio portions of the audio stream 141. For example, disregarding the audio feature data set 252 includes refraining from comparing the audio feature data set 252 to the plurality of user speech profiles 150, refraining from updating a user speech profile 150 based on the audio feature data set 252, refraining from generating a user speech profile 150 based on the audio feature data set 252, or a combination thereof.

In a particular aspect, audio portions corresponding to shorter than threshold silence (e.g., indicative of natural short pauses in speech of the same user) are not used to generate or update a user speech profile 150 but are tracked to detect a longer than threshold silence. For example, during the segmentation stage, the segmentor 124 generates a segmentation result 236 for the audio feature data set 252 indicating that the audio portion 151 corresponds to silence. The profile manager 126 increments (e.g., by 1) a silence count 262 in response to determining that the audio portion 151 corresponds to silence. In a particular aspect, the profile manager 126, in response to determining that the silence count 262 is greater than or equal to the silence threshold 294 (e.g., indicative of a longer pause after a user has finished speaking), resets (e.g., marks as empty) the enroll buffers 234 (e.g., the enroll buffer 234A, the enroll buffer 234B, and the enroll buffer 234C), resets (e.g., marks as empty) the probe buffers 240 (e.g., the probe buffer 240A, the probe buffer 240B, and the probe buffer 240C), resets (e.g., to 0) the silence count 262, or a combination thereof, and continues to process subsequent audio portions of the audio stream 141. In a particular aspect, the profile manager 126 determines that the stop condition 270 is satisfied in response to determining that the silence count 262 is greater than or equal to the silence threshold 294. The profile manager 126 resets the enroll buffers 234 (e.g., the enroll buffer 234A, the enroll buffer 234B, and the enroll buffer 234C) in response to determining that the stop condition 270 is satisfied.

In a particular aspect, the profile manager 126 provides a notification to a display device coupled to the device 202. The notification indicates that user speech analysis is in progress. In a particular aspect, the profile manager 126 selectively processes the audio stream 141 based on a user input indicating whether user speech analysis is to be performed.

Returning to FIG. 2A, in a particular aspect, the profile manager 126 maintains the profile update data 272 to track how many of the user speech profiles 150 are generated or updated during processing of the audio stream 141. For example, the profile manager 126 updates the profile update data 272 in response to updating (or generating) a user speech profile 150. In a particular example, the profile manager 126, in response to updating the user speech profile 150A, updates the profile update data 272 to indicate that the user speech profile 150A is updated. As another example, the profile manager 126, in response to generating the user speech profile 150C, updates the profile update data 272 to indicate that the user speech profile 150C is updated. The profile manager 126, in response to determining that the profile update data 272 indicates that a first count of the plurality of user speech profiles 150 have been updated during processing of the audio stream 141, outputs the first count as a count of talkers detected in the audio stream 141.

In a particular aspect, the profile manager 126 maintains the user interaction data 274 to track duration of speech detected that matches each of the plurality of user speech profiles 150. The profile manager 126 updates the user interaction data 274 based on updating (or generating) a user speech profile 150. For example, the profile manager 126, in response to updating the user speech profile 150A based on an audio portion 151, updates the user interaction data 274 to indicate that a user associated with the user speech profile 150A interacted for a speech duration of the audio portion 151. As another example, the profile manager 126, in response to generating the user speech profile 150C based on an audio portion 151, updates the user interaction data 274 to indicate that a user associated with the user speech profile 150C interacted for a speech duration of the audio portion 151. To illustrate, after generating or updating a user speech profile 150 based on the audio portions of the talker-homogenous audio segment 111, the user interaction data 274 indicates that the user associated with the user speech profile 150 interacted for a speech duration of the talker-homogenous audio segment 111. In a particular aspect, the profile manager 126 outputs the user interaction data 274.

In a particular aspect, the profile manager 126 provides the profile ID 155, the profile update data 272, the user interaction data 274, additional information, or a combination thereof, to the one or more audio analysis applications 180. For example, an audio analysis application 180 performs speech-to-text conversion on the audio feature data sets 252 to generate a transcript of the audio stream 141. The audio analysis application 180 labels text corresponding to an audio feature data set 252 in the transcript based on the profile ID 155 received from the profile manager 126 for the audio feature data set 252.

In a particular aspect, the one or more processors 220 are configured to operate in one of multiple power modes. For example, the one or more processors 220 are configured to operate in a power mode 282 (e.g., an always-on power mode) or a power mode 284 (e.g., an on-demand power mode). In a particular aspect, the power mode 282 is a lower power mode as compared to the power mode 284. For example, the one or more processors 220 conserve energy by operating in the power mode 282 (as compared to the power mode 284) and transition to the power mode 284 as needed to activate components that do not operate in the power mode 282.

In a particular example, some of the functions of the device 202 are active in the power mode 284 but not in the power mode 282. For example, the talker detector 278 can be activated in the power mode 282 and in the power mode 284. In this example, the feature extractor 222, the segmentor 124, the profile manager 126, the one or more audio analysis applications 180, or a combination thereof, can be activated in the power mode 284 and not in the power mode 282. When the audio stream 141 corresponds to speech of a single talker, the segmentor 124 does not have to be used to distinguish between audio portions corresponding to different talkers. Staying in (or transitioning to) the power mode 282 when the segmentor 124 does not have to be used reduces overall resource consumption. The talker detector 278 is configured to determine, in the power mode 282, whether the audio stream 141 corresponds to speech of at least two distinct talkers. The one or more processors 220 are configured to, in response to determining that an output of the talker detector 278 indicates that the audio stream 141 corresponds to speech of at least two distinct talkers, transition from the power mode 282 to the power mode 284 and activate the segmentor 124. For example, the segmentor 124, in the power mode 284, analyzes the audio feature data sets 252 to generate the segmentation result 236.

In a particular example, the talker detector 278 and the profile manager 126 can be activated in the power mode 282 and in the power mode 284. In this example, the feature extractor 222, the segmentor 124, the one or more audio analysis applications 180, or a combination thereof, can be activated in the power mode 284 and not in the power mode 282. For example, in response to an output of the talker detector 278 indicating that a single talker is detected, the one or more processors 220 remain or transition to the power mode 282. In the power mode 282, the profile manager 126 generates or updates a user speech profile 150 of the single talker based on the audio feature data sets 252. Alternatively, the one or more processors 220, in response to an output of the talker detector 278 indicating that the audio stream 141 corresponds to speech of at least two distinct talkers, transition from the power mode 282 to the power mode 284 and activate the segmentor 124. For example, the segmentor 124, in the power mode 284, analyzes the audio feature data sets 252 to generate the segmentation result 236.

In a particular example, the feature extractor 222, the talker detector 278, the segmentor 124, or a combination thereof, can be activated in the power mode 282 and in the power mode 284. In this example, the profile manager 126, the one or more audio analysis applications 180, or a combination thereof, can be activated in the power mode 284 and not in the power mode 282. In a particular aspect, the one or more processors 220 are configured to, in response to determining that the segmentation result 236 indicates that the audio stream 141 corresponds to speech of at least two distinct talkers, transitions from the power mode 282 to the power mode 284 and activates the profile manager 126, the one or more audio analysis applications 180, or a combination thereof. For example, the profile manager 126, in the power mode 284, performs the comparison of the audio feature data set 252 to the plurality of user speech profiles 150.

In a particular aspect, the one or more processors 220, in response to determining that the segmentation result 236 indicates that the audio stream 141 corresponds to speech of at least two distinct talkers, process subsequent audio portions of the audio stream 141 in the power mode 284. For example, the feature extractor 222, the segmentor 124, or both, operate in the power mode 284 to process the subsequent audio portions. In a particular aspect, the feature extractor 222, the talker detector 278, the segmentor 124, or a combination thereof, determine audio information of the audio stream 141 in the power mode 282 and provide the audio information to the one or more audio analysis applications 180 in the power mode 284. The audio information includes a count of talkers indicated in the audio stream 141, voice activity detection (VAD) information, or both.

In a particular implementation, one or more portions of the audio stream 141, the audio feature data sets 252, or a combination thereof, are stored in the buffer 268, and the one or more processors 220 access the one or more portions of the audio stream 141, the audio feature data sets 252, or a combination thereof, from the buffer 268. For example, the one or more processors 220 store the audio portion 151 in the buffer 268. The feature extractor 222 retrieves the audio portion 151 from the buffer 268 and stores the audio feature data set 252 in the buffer 268. The segmentor 124 retrieves the audio feature data set 252 from the buffer 268 and stores the segmentation scores 254, the data set segmentation result 256, or a combination thereof, of the audio feature data set 252 in the buffer 268. The profile manager 126 retrieves the audio feature data set 252, the segmentation scores 254, the data set segmentation result 256, or a combination thereof from the buffer 268. In a particular aspect, the profile manager 126 stores the profile ID 155, the profile update data 272, the user interaction data 274, or a combination thereof, in the buffer 268. In a particular aspect, the one or more audio analysis applications 180 retrieve the profile ID 155, the profile update data 272, the user interaction data 274, or a combination thereof, from the buffer 268.

The system 200 thus enables passive user speech profile enrollment and update for multiple talkers. For example, the plurality of user speech profiles 150 can be generated and updated in the background during regular operation of the device 202 without having the users 242 having to say predetermined words or sentences from a script.

Although the microphone 246 is illustrated as being coupled to the device 202, in other implementations the microphone 246 may be integrated in the device 202. Although a single microphone 246 is illustrated, in other implementations one or more additional microphones 146 configured to capture user speech may be included.

Although the system 200 is illustrated as including a single device 202, in other implementations operations described as being performed at the device 202 may be distributed among multiple devices. For example, operations described as being performed by one or more of the feature extractor 222, the talker detector 278, the segmentor 124, the profile manager 126, or the one or more audio analysis applications 180 may be performed at the device 202, and operations described as being performed by others of the feature extractor 222, the talker detector 278, the segmentor 124, the profile manager 126, or the one or more audio analysis applications 180 may be performed at a second device.

Referring to FIG. 3, an illustrative aspect of operations 300 associated with user speech profile management is shown. In a particular aspect, one or more of the operations 300 are performed by the segmentor 124, the profile manager 126 of FIG. 1, the feature extractor 222, the one or more processors 220, the device 202, the system 200 of FIG. 2A, or a combination thereof.

During talker segmentation 302, the feature extractor 222 of FIG. 2A generates audio feature data sets 252 based on the audio stream 141, as described with reference to FIG. 2A. The segmentor 124 analyzes the audio feature data sets 252 to generate the segmentation result 236, as described with reference to FIG. 2A.

During voice profile management 304, the profile manager 126 of FIG. 1 determines whether an audio feature data set 252 corresponds to an enrolled talker, at 306. For example, the profile manager 126 determines whether the audio feature data set 252 matches any user speech profile 150, as described with reference to FIG. 2B. The profile manager 126, in response to determining, at 306, that the audio feature data set 252 matches a user speech profile 150A having a profile ID 155, updates the user speech profile 150A based at least in part on the audio feature data set 252, at 308. Alternatively, the profile manager 126, in response to determining, at 306, that the audio feature data set 252 does not match any of the plurality of user speech profiles 150 and that the segmentation result 236 indicates that the audio feature data set 252 represents speech of the talker 292A, adds the audio feature data set 252 to the enroll buffer 234A designated for the talker 292A, at 310.

The profile manager 126, in response to determining, at 312, that a count of audio feature data sets of the enroll buffer 234A (or a speech duration of the audio feature data sets of the enroll buffer 234A) is greater than the enroll threshold 264, enrolls the talker, at 314. For example, the profile manager 126 generates a user speech profile 150C based on the audio feature data sets of the enroll buffer 234A and adds the user speech profile 150C to the plurality of user speech profiles 150, as described with reference to FIG. 2B. The profile manager 126 continues to process subsequent audio portions of the audio stream 141.

The segmentation result 236, generated during the talker segmentation 302, thus enables audio feature data sets corresponding to speech of the same talker to be collected in the same enrollment buffer for talker enrollment during voice profile management 304. Generating the user speech profile 150C based on multiple audio feature data sets improves accuracy of the user speech profile 150C in representing the speech of the talker.

Figure 4:
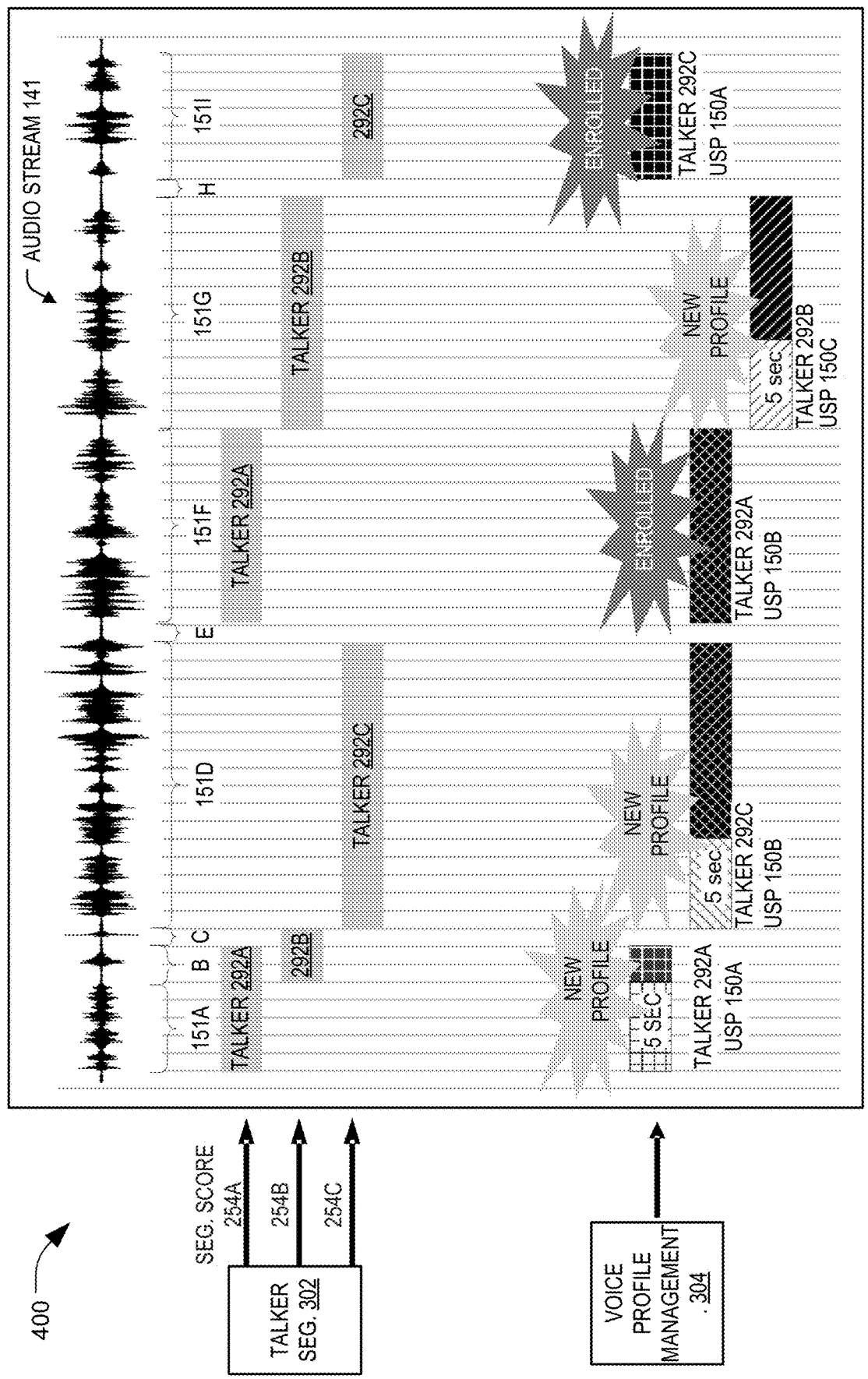
FIG. 4 is a diagram of an illustrative aspect of operations associated with user speech profile management, in accordance with some examples of the present disclosure.

Referring to FIG. 4, an illustrative aspect of operations 400 associated with user speech profile management are shown. In a particular aspect, one or more of the operations 400 are performed by the segmentor 124, the profile manager 126 of FIG. 1, the feature extractor 222, the one or more processors 220, the device 202, the system 200 of FIG. 2A, or a combination thereof.

The audio stream 141 includes audio portions 151A-audio portions 151I. During the talker segmentation 302, the segmentor 124 of FIG. 1 generates a segmentation score 254A, a segmentation score 254B, and a segmentation score 254C for each of the audio portions 151A-I, as described with reference to FIG. 2A.

The segmentation scores 254 indicate that the audio portions 151A correspond to speech of the same single talker (e.g., designated as a talker 292A). For example, the segmentation score 254A of each of the audio portions 151A satisfies the segmentation threshold 257. The segmentation score 254B and the segmentation score 254C of each of the audio portions 151A do not satisfy the segmentation threshold 257.

During the voice profile management 304, the profile manager 126 adds the audio portions 151A (e.g., the corresponding audio feature data sets) in the enroll buffer 234A associated with the talker 292A. The profile manager 126 generates a user speech profile 150A based on the audio portions 151A (e.g., the corresponding audio feature data sets).

In a particular aspect, the segmentation scores 254 indicate that audio portions 151B correspond to speech of multiple talkers, e.g., the talker 292A and another talker (e.g., designated as a talker 292B). In FIG. 4, the profile manager 126 updates the user speech profile 150A based on the audio portions 151B (e.g., the corresponding audio feature data sets). In a particular aspect, the profile manager 126 also adds the audio portions 151B to an enroll buffer 234B associated with the talker 292B. In an alternative aspect, the profile manager 126 disregards the audio portions 151B corresponding to multiple talkers. For example, the profile manager 126 refrains from using the audio portions 151B to update or generate a user speech profile 150.

The segmentation scores 254 indicate that audio portions 151C correspond to speech of the talker 292B (e.g., a single talker). The profile manager 126 adds the audio portions 151C to the enroll buffer 234B. The profile manager 126, in response to determining that the audio portions (e.g., the corresponding audio feature data sets) stored in the enroll buffer 234B fail to satisfy the enroll threshold 264, refrains from generating a user speech profile 150 based on the audio portions (e.g., the corresponding audio feature data sets) stored in the enroll buffer 234B. In a particular aspect, the audio portions (e.g., the corresponding audio feature data sets) stored in the enroll buffer 234B include the audio portions 151B (e.g., the corresponding audio feature data sets) and the audio portions 151C (e.g., the corresponding audio feature data sets). In an alternative aspect, the audio portions (e.g., the corresponding audio feature data sets) stored in the enroll buffer 234B include the audio portions 151C (e.g., the corresponding audio feature data sets) and do not include the audio portions 151B (e.g., the corresponding audio feature data sets).

The segmentation scores 254 indicate that audio portions 151D correspond to speech of another single talker (e.g., designated as the talker 292C). The profile manager 126 adds a first subset of the audio portions 151D (e.g., corresponding audio feature data sets) to the enroll buffer 234C. The profile manager 126, in response to determining that the first subset of the audio portions 151D (e.g., the corresponding audio feature data sets) stored in the enroll buffer 234C satisfies the enroll threshold 264, generates a user speech profile 150B based on the first subset of the audio portions 151D (e.g., the corresponding audio feature data sets) stored in the enroll buffer 234C. The profile manager 126 updates the user speech profile 150B based on a second subset of the audio portions 151D.

The segmentation scores 254 indicate that audio portions 151E correspond to greater than threshold silence. For example, a count of the audio portions 151E is greater than or equal to the silence threshold 294. The profile manager 126 resets the enroll buffers 234 in response to determining that the audio portions 151E correspond to greater than threshold silence.

The segmentation scores 254 indicate that audio portions 151F correspond to speech of a single talker (e.g., designated as the talker 292A). The profile manager 126, in response to determining that each of the audio portions 151F matches the user speech profile 150B, updates the user speech profile 150B based on the audio portions 151F. Because the talker designation (e.g., the talker 292A) is being reused, the audio portion 151D and the audio portion 151F are associated with different designated talkers, e.g., the talker 292C and the talker 292A, respectively, even though the audio portion 151D and the audio portion 151F correspond to speech of the same talker (e.g., the user 242C of FIG. 2A) and match the same user speech profile (e.g., the user speech profile 150B).

The segmentation scores 254 indicate that audio portions 151G correspond to speech of a single talker (e.g., designated as the talker 292B). The profile manager 126, in response to determining that a first subset of the audio portions 151G do not match any of the user speech profiles 150, adds the first subset of the audio portions 151G to the enroll buffer 234B associated with the talker 292B. The profile manager 126 generates a user speech profile 150C based on the first subset of the audio portions 151G and updates the user speech profile 150C based on a second subset of the audio portions 151G. Because the talker designation (e.g., the talker 292B) is being reused, the audio portion 151C and the audio portion 151G are associated with the same designated talker, e.g., the talker 292B, the audio portion 151C and the audio portion 151G can correspond to speech of the same user or different users.

The segmentation scores 254 indicate that audio portions 151H correspond to greater than threshold silence. The profile manager 126 resets the enroll buffers 234 in response to determining that the audio portions 151H correspond to greater than threshold silence.

The segmentation scores 254 indicate that audio portions 151I correspond to speech of a single talker (e.g., designated as the talker 292C). The profile manager 126, in response to determining that each of the audio portions 151I matches the user speech profile 150A, updates the user speech profile 150A based on the audio portions 151I. Because the talker designation (e.g., the talker 292C) is being reused, the audio portion 151A and the audio portion 151I are associated with different designated talkers, e.g., the talker 292A and the talker 292C, respectively, even though the audio portion 151A and the audio portion 151I correspond to speech of the same user (e.g., the user 242A of FIG. 2A) and match the same user speech profile (e.g., the user speech profile 150A). In an alternative aspect, the profile manager 126, in response to determining that the audio portions 151I do not match any of the plurality of user speech profiles 150, adds a first subset of the audio portions 151I in the enroll buffer 234C associated with the talker 292C and generates a user speech profile 150D based on the first subset of the audio portions 151I. By reusing the talker designation (e.g., the talker 292C), the profile manager 126 can generate (or update) a greater count of user profiles than the pre-determined count (e.g., K) of talkers 292 that can be distinguished by the segmentor 124.

Figure 5:
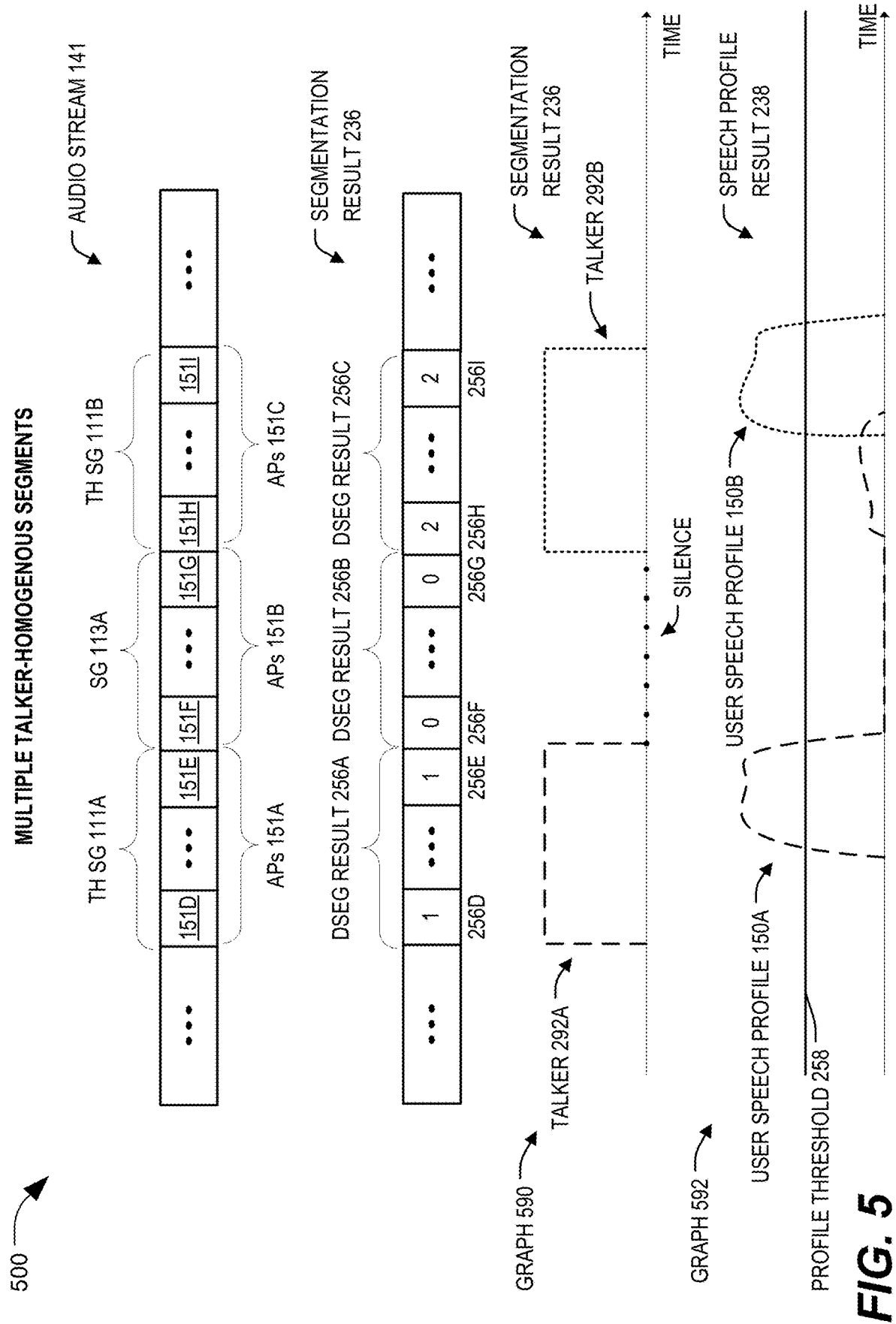
FIG. 5 is a diagram of an illustrative aspect of operations associated with user speech profile management, in accordance with some examples of the present disclosure.

Referring to FIG. 5, an illustrative aspect of operations 500 associated with user speech profile management are shown. In a particular aspect, one or more of the operations 500 are performed by the segmentor 124, the profile manager 126 of FIG. 1, the feature extractor 222, the one or more processors 220, the device 202, the system 200 of FIG. 2A, or a combination thereof.

The audio stream 141 includes audio portions 151A, audio portions 151B, and audio portions 151C. For example, the audio portions 151A include an audio portion 151D (e.g., an audio frame), one or more additional audio portions, and an audio portion 151E. The audio portions 151B include an audio portion 151F, one or more additional audio portions, an audio portion 151G. The audio portions 151C include an audio portion 151H, one or more additional audio portions, and an audio portion 151I.

In a particular aspect, a data set segmentation result 256A of each of the audio portions 151A indicates that the audio portion 151A corresponds to speech of a talker 292A. For example, a data set segmentation result 256D (e.g., "1") of the audio portion 151D indicates that the audio portion 151D represents speech of the talker 292A. As another example, a data set segmentation result 256E (e.g., "1") of the audio portion 151E indicates that the audio portion 151E represents speech of the talker 292A.

The data set segmentation result 256B of each of the audio portions 151B indicates that the audio portion 151B correspond to silence (or non-speech noise). For example, a data set segmentation result 256F (e.g., "0") of the audio portion 151F indicates that the audio portion 151F represents silence (or non-speech noise). As another example, a data set segmentation result 256G (e.g., "0") of the audio portion 151G indicates that the audio portion 151G represents silence (or non-speech noise).

The data set segmentation result 256C of each of the audio portions 151C indicates that the audio portion 151C corresponds to speech of a talker 292B. For example, a data set segmentation result 256H (e.g., "2") of the audio portion 151H indicates that the audio portion 151H represents speech of the talker 292B. As another example, a data set segmentation result 256I (e.g., "2") of the audio portion 151I indicates that the audio portion 151I represents speech of the talker 292B.

A graph 590 is a visual depiction of an example of the segmentation result 236. For example, the audio portions 151A represent speech of the talker 292A (e.g., a single talker) so the audio portions 151A correspond to the talker-homogenous audio segment 111A of the audio stream 141. The audio portions 151B represent silence so the audio portions 151B correspond to an audio segment 113A (e.g., not a talker-homogenous audio segment) of the audio stream 141. The audio portions 151C represent speech of the talker 292B (e.g., a single talker) so the audio portions 151C correspond to the talker-homogenous audio segment 111B of the audio stream 141.

A graph 592 is a visual depiction of an example of the speech profile result 238. The profile manager 126 generates a user speech profile 150A based on a first subset of the audio portions 151A. The profile manager 126, after generation of the user speech profile 150A, determines a speech profile result 238A by comparing subsequent audio portions (e.g., subsequent audio feature data sets) to the user speech profile 150A. The speech profile result 238A of an audio portion 151 indicates a likelihood that the audio portion 151 matches the user speech profile 150A. The profile manager 126 determines the speech profile result 238A of a first subset of the audio portions 151C by comparing the first subset of the audio portions 151C to the user speech profile 150A. The profile manager 126, in response to determining that the speech profile result 238A of the first subset of the audio portions 151C is less than the profile threshold 258, determines that the first subset of the audio portions 151C do not match the user speech profile 150A.

The profile manager 126, in response to determining that the first subset of the audio portions 151C do not match the user speech profile 150A, generates a user speech profile 150B based on the first subset of the audio portions 151C. The profile manager 126, after generation of the user speech profile 150B, determines the speech profile result 238B by comparing subsequent audio portions to the user speech profile 150B. The speech profile result 238B indicates a likelihood that audio portions match the user speech profile 150B. For example, the speech profile result 238B of a second subset of the audio portions 151C indicates that the second subset of the audio portions 151C match the user speech profile 150B. In a particular aspect, the profile manager 126 generates a graphical user interface (GUI) that includes the graph 590, the graph 592, or both, and provides the GUI to a display device.

Figure 6:
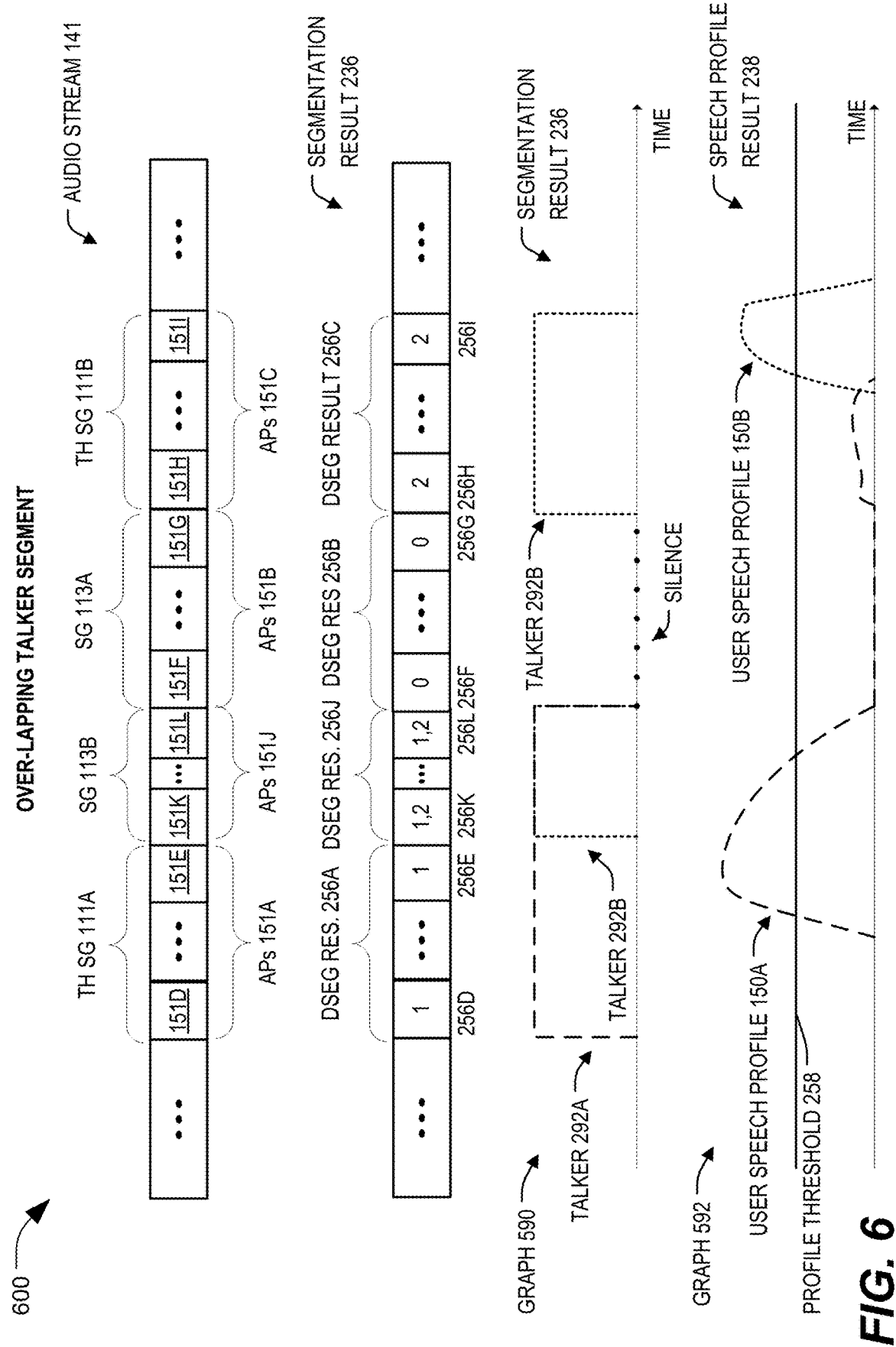
FIG. 6 is a diagram of an illustrative aspect of operations associated with user speech profile management, in accordance with some examples of the present disclosure.

Referring to FIG. 6, an illustrative aspect of operations 600 associated with user speech profile management are shown. In a particular aspect, one or more of the operations 600 are performed by the segmentor 124, the profile manager 126 of FIG. 1, the feature extractor 222, the one or more processors 220, the device 202, the system 200 of FIG. 2A, or a combination thereof.

The audio stream 141 includes audio portions 151J corresponding to speech of multiple talkers. For example, the audio portions 151J include an audio portion 151K (e.g., an audio frame), one or more additional audio portions, and an audio portion 151L. In a particular aspect, the data set segmentation result 256D of each of the audio portions 151J indicates that the audio portion 151J corresponds to speech of the talker 292A and a talker 292B. For example, a data set segmentation result 256K (e.g., "1, 2") of the audio portion 151K indicates that the audio portion 151K represents speech of the talker 292A and the talker 292B. As another example, a data set segmentation result 256L (e.g., "1, 2") of the audio portion 151L indicates that the audio portion 151L represents speech of the talker 292A and the talker 292B. The audio portions 151J represent speech of multiple talkers so the audio portions 151J correspond to an audio segment 113B (e.g., not a talker-homogenous audio segment).

The profile manager 126, after generation of the user speech profile 150A, determines the speech profile result 238A by comparing subsequent audio portions (e.g., subsequent audio feature data sets) to the user speech profile 150A. The profile manager 126 determines the speech profile result 238A of the audio portions 151J by comparing the audio portions 151J to the user speech profile 150A. In a particular aspect, the speech profile result 238A for the audio portions 151J is lower than the speech profile result 238A for the audio portions 151A because the audio portions 151J include speech of the talker 292B in addition to the speech of the talker 292A.

Figure 7:
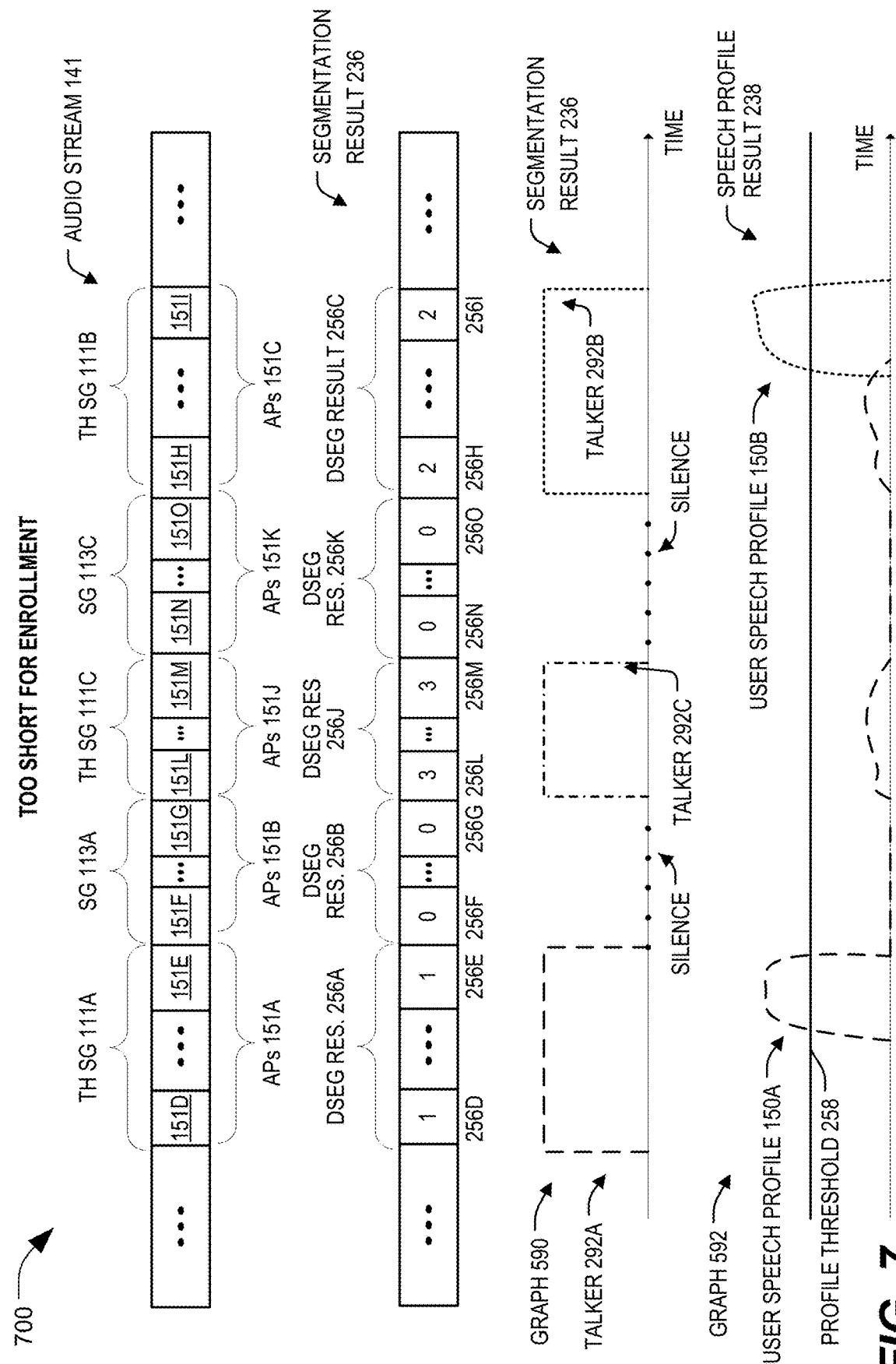
FIG. 7 is a diagram of an illustrative aspect of operations associated with user speech profile management, in accordance with some examples of the present disclosure.

Referring to FIG. 7, an illustrative aspect of operations 700 associated with user speech profile management are shown. In a particular aspect, one or more of the operations 700 are performed by the feature extractor 222, the segmentor 124, the profile manager 126, the one or more processors 220, the device 202, the system 200 of FIG. 2A, or a combination thereof.

The audio stream 141 includes audio portions 151J and the audio portions 151K. For example, the audio portions 151J include an audio portion 151L (e.g., an audio frame), one or more additional audio portions, and an audio portion 151M. The audio portions 151K include an audio portion 151N (e.g., an audio frame), one or more additional audio portions, and an audio portion 151O.

In a particular aspect, the data set segmentation result 256J of each of the audio portions 151J indicates that the audio portion 151J represents speech of a talker 292C (e.g., a single talker) so the audio portions 151J correspond to a talker-homogenous audio segment 111C. The data set segmentation result 256K of each of the audio portions 151K indicates that the audio portion 151K represents silence (or non-speech noise) so the audio portions 151K correspond to an audio segment 113C.

The profile manager 126, after generation of the user speech profile 150A, determines the speech profile result 238A of the audio portions 151J by comparing the audio portions 151J to the user speech profile 150A. The profile manager 126, in response to determining that the speech profile result 238A is less than the profile threshold 258, determines that the audio portions 151J do not match the user speech profile 150A.

The profile manager 126, in response to determining that the audio portions 151J do not match the user speech profile 150A, stores the audio portions 151J in the enroll buffer 234C associated with the talker 292C. The profile manager 126, in response to determining that the audio portions 151J stored in the enroll buffer 234C fail to satisfy the enroll threshold 264, refrains from generating a user speech profile 150 based on the audio portions 151J stored in the enroll buffer 234C. The profile manager 126 resets (e.g., marks as empty) the enroll buffers 234 in response to determining that the audio portions 151K indicate a greater than threshold silence. The audio portions 151J are thus removed from the enroll buffer 234C when the talker 292C appears to have stopped talking.

Figure 8:
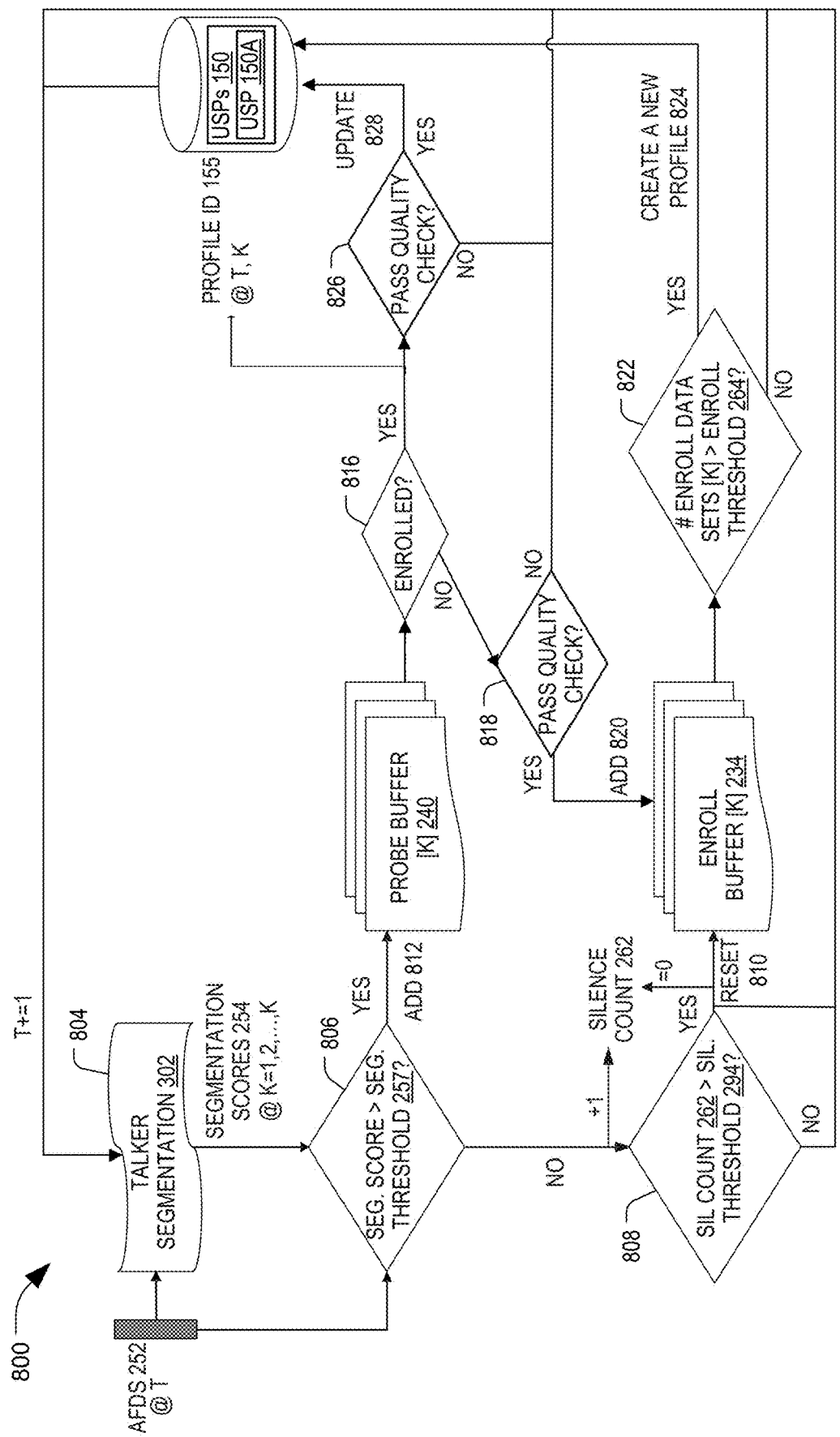
FIG. 8 is a diagram of an illustrative aspect of operations associated with user speech profile management, in accordance with some examples of the present disclosure.

Referring to FIG. 8, an illustrative aspect of operations 800 associated with user speech profile management are shown. In a particular aspect, one or more of the operations 800 are performed by the segmentor 124, the profile manager 126 of FIG. 1, the feature extractor 222, the one or more processors 220, the device 202, the system 200 of FIG. 2A, or a combination thereof.

The segmentor 124 of FIG. 1 performs the talker segmentation 302, at 804. For example, the segmentor 124 receives the audio feature data set 252 from the feature extractor 222 at a time T and generates the segmentation scores 254 for the audio feature data set 252 of an audio portion 151, as described with reference to FIG. 2A.

The profile manager 126 of FIG. 1 determines whether any of the segmentation scores 254 satisfy the segmentation threshold 257, at 806. For example, the profile manager 126, in response to determining that none of the segmentation scores 254 satisfy the segmentation threshold 257, determines that the audio feature data set 252 represents silence (or non-speech noise) and increments (e.g., by 1) the silence count 262. The profile manager 126, subsequent to incrementing the silence count 262, determines whether the silence count 262 is greater than the silence threshold 294, at 808.

The profile manager 126, in response to determining that the silence count 262 is greater than the silence threshold 294, at 808, performs a reset, at 810. For example, the profile manager 126 performs the reset by resetting the enroll buffers 234 (e.g., marks as empty), the probe buffers 240 (e.g., marks as empty), the silence count 262 (e.g., reset to 0), or a combination thereof, and returns to 804 to process subsequent audio feature data sets of the audio stream 141. Alternatively, the profile manager 126, in response to determining that the silence count 262 is less than or equal to the silence threshold 294, at 808, returns to 804 to process subsequent audio feature data sets of the audio stream 141.

The profile manager 126, in response to determining that at least one of the segmentation scores 254 satisfies the segmentation threshold 257, at 806, adds the audio feature data set 252 to at least one of the probe buffers 240, at 812. For example, the profile manager 126 in response to determining that the segmentation score 254A associated with the talker 292A satisfies the segmentation threshold 257, determines that the audio feature data set 252 represents speech of the talker 292A and adds the audio feature data set 252 to the probe buffer 240A associated with the talker 292A. In a particular implementation, the audio feature data set 252 representing speech of multiple talkers 292 is added to multiple probe buffers 240 corresponding to the multiple talkers 292. For example, the profile manager 126, in response to determining that each of the segmentation score 254A and the segmentation score 254B satisfies the segmentation threshold 257, adds the audio feature data set 252 to the probe buffer 140A and the probe buffer 140B. In an alternative implementation, the audio feature data set 252 representing speech of multiple talkers 292 is disregarded and not added to the probe buffers 240.

The profile manager 126 determines whether the corresponding talker (e.g., the talker 292A) is enrolled, at 816. For example, the profile manager 126 determines whether a talker 292 (e.g., the talker 292A) is enrolled by comparing audio feature data sets (e.g., including the audio feature data set 252) of the corresponding probe buffer 240 (e.g., the probe buffer 240A) to the plurality of user speech profiles 150.

The profile manager 126, in response to determining that the talker 292 (e.g., the talker 292A) is not enrolled, at 816, determines whether the audio feature data set 252 passes quality check, at 818. For example, the profile manager 126, in response to determining that the audio feature data set 252 corresponds to multiple talkers 292, determines that the audio feature data set 252 fails the quality check. Alternatively, the profile manager 126, in response to determining that the audio feature data set 252 corresponds to a single talker, determines that the audio feature data set 252 passes the quality check.

The profile manager 126, in response to determining that the audio feature data set 252 fails to pass the quality check, at 818, returns to 804 to process subsequent audio feature data sets of the audio stream 141. Alternatively, the profile manager 126, in response to determining that the audio feature data set 252 passes the quality check, at 818, adds the audio feature data set 252 representing speech of a talker 292 (e.g., the talker 292A) to the enroll buffer 234 (e.g., the enroll buffer 234A) associated with the talker 292, at 820.

The profile manager 126 determines whether a count of audio feature data sets stored in an enroll buffer 234 (e.g., the enroll buffer 234A) is greater than the enroll threshold 264, at 822. The profile manager 126, in response to determining that the count of audio feature data sets stored in each of the enroll buffers 234 (e.g., the enroll buffer 234) is less than or equal to the enroll threshold 264, at 822, returns to 804 to process subsequent audio feature data sets of the audio stream 141. Alternatively, the profile manager 126, in response to determining that the count of audio feature data sets of an enroll buffer 234 (e.g., the enroll buffer 234A) is greater than the enroll threshold 264, generates a user speech profile 150A, at 824, adds the user speech profile 150A to the plurality of user speech profiles 150, and returns to 804 to process subsequent audio feature data sets of the audio stream 141.

The profile manager 126, in response to determining that the talker 292A is enrolled, at 816, determines whether the audio feature data set 252 (or the audio feature data sets of a probe buffer 240 associated with a talker 292 whose speech is represented by the audio feature data set 252) passes a quality check, at 826. The profile manager 126, in response to determining that the audio feature data set 252 (or the audio feature data sets of the probe buffer 240) fail to pass the quality check, at 826, returns to 804 to process subsequent audio feature data sets of the audio stream 141. The profile manager 126, in response to determining that the audio feature data set 252 (or the audio feature data sets of the probe buffer 240) passes the quality check, at 826, updates a user speech profile 150A (that matches the audio feature data set 252) based on the audio feature data set 252 (or the audio feature data sets of the probe buffer 240) and returns to 804 to process subsequent audio feature data sets of the audio stream 141. In an alternative aspect, the quality check, at 826, is performed prior to adding the audio feature data set 252 to a probe buffer 240. For example, the profile manager 126, in response to determining that the audio feature data set 252 fails to pass the quality check, refrains from adding the audio feature data set 252 to the probe buffer 240 and returns to 804 to process subsequent audio feature data sets of the audio stream 141.

Figure 9:
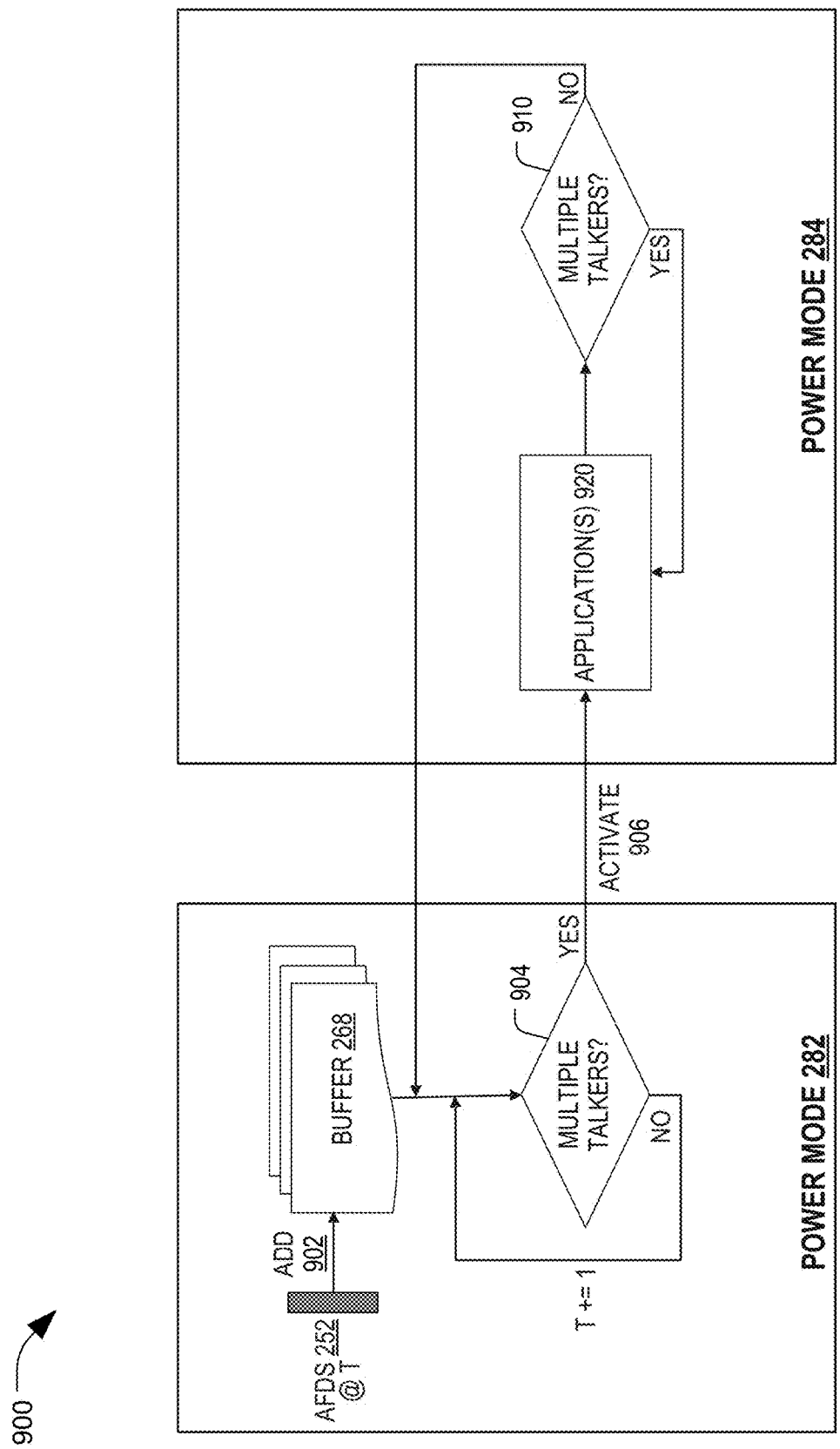
FIG. 9 is a diagram of an illustrative aspect of operations associated with user speech profile management, in accordance with some examples of the present disclosure.

Referring to FIG. 9, an illustrative aspect of operations 900 associated with user speech profile management are shown. In a particular aspect, one or more of the operations 900 are performed by the segmentor 124, the profile manager 126 of FIG. 1, the feature extractor 222, the talker detector 278, the one or more processors 220, the device 202, the system 200 of FIG. 2A, or a combination thereof.

The one or more processors 220, in the power mode 282, add audio features (e.g., the audio feature data set 252) to the buffer 268 at a time T. The talker detector 278 of FIG. 2A determines whether multiple talkers are detected in the audio stream 141, at 904. For example, the talker detector 278 determines that multiple talkers are detected in response to determining that the audio features (e.g., the audio feature data set 252) represents speech of multiple talkers. In another example, the talker detector 278 determines that multiple talkers are detected in response to determining that the audio features (e.g., the audio feature data set 252) represents speech of a second talker subsequent to speech of a first talker having been detected in a previous audio features (e.g., a previous audio feature data set).

The talker detector 278, in response to determining that multiple talkers have not been detected in the audio stream 141, at 904, continues to process subsequent audio features of the audio stream 141. Alternatively, the talker detector 278, in response to determining that multiple talkers are detected in the audio stream 141, at 904, transitions the one or more processors 220 from the power mode 282 to the power mode 284 and activates one or more applications 920, at 906. In a particular aspect, the one or more applications 920 include the feature extractor 222, the segmentor 124, the profile manager 126, the one or more audio analysis applications 180, or a combination thereof. In a particular aspect, the talker detector 278 generates at least one of a wakeup signal or an interrupt to transition the one or more processors 220 from the power mode 282 to the power mode 284 to activate the one or more applications 920.

The talker detector 278, in the power mode 284, determines whether multiple talkers are detected, at 910. For example, the talker detector 278 determines whether multiple talkers are detected after a threshold time has expired since a previous determination of whether multiple talkers are detected. The talker detector 278, in response to determining that multiple talkers are detected, refrains from transitioning to the power mode 282. Alternatively, the talker detector 278, in response to determining that multiple talkers are not detected within a threshold count of audio feature data sets, transitions the one or more processors 220 from the power mode 284 to the power mode 282.

The one or more processors 220 thus conserve energy by operating in the power mode 282 (as compared to the power mode 284) and transition to the power mode 284 as needed to activate components that do not operate in the power mode 282. Selective transitioning to the power mode 284 reduces overall power consumption of the device 202.

Figure 10:
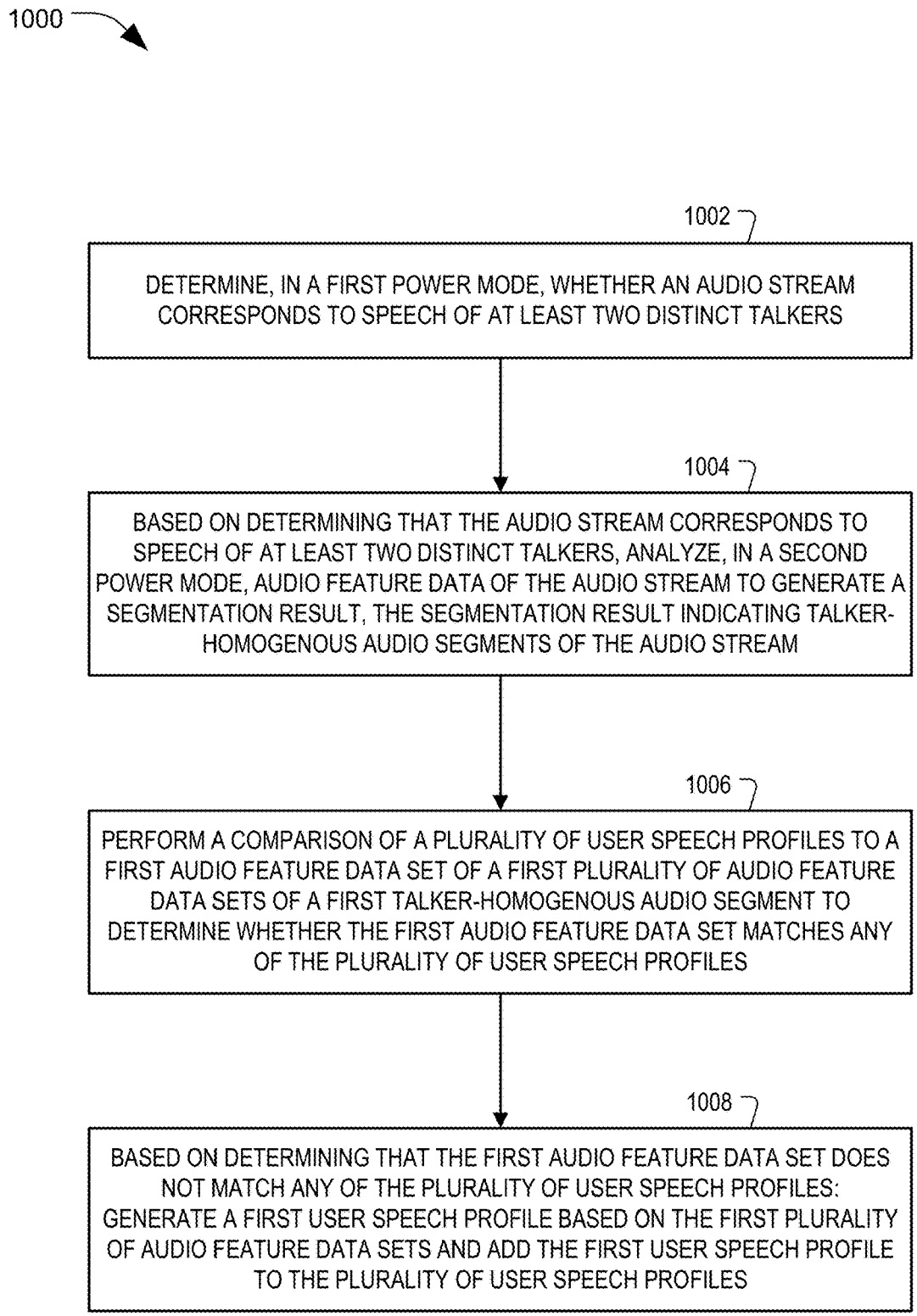
FIG. 10 is diagram of a particular implementation of a method of user speech profile management that may be performed by the system of FIG. 2A, in accordance with some examples of the present disclosure.

Referring to FIG. 10, a particular implementation of a method 1000 of user speech profile management is shown. In a particular aspect, one or more operations of the method 1000 are performed by at least one of the segmentor 124, the profile manager 126 of FIG. 1, the talker detector 278, the one or more processors 220, the device 202, the system 200 of FIG. 2A, or a combination thereof.

The method 1000 includes determining, in a first power mode, whether an audio stream corresponds to speech of at least two distinct talkers, at 1002. For example, the talker detector 278 of FIG. 2A determines, in the power mode 282, whether the audio stream 141 corresponds to speech of at least two distinct talkers, as described with reference to FIG. 2A.

The method 1000 includes, based on determining that the audio stream corresponds to speech of at least two distinct talkers, analyzing, in a second power mode, audio feature data of the audio stream to generate a segmentation result, at 1004. For example, the one or more processors 220 of FIG. 2A, based on determining that the audio stream 141 corresponds to speech of at least two distinct talkers, transitions to the power mode 284 and activates the segmentor 124, as described with reference to FIG. 2A. The segmentor 124, in the power mode 284, analyzes the audio feature data sets 252 of the audio stream 141 to generate the segmentation result 236, as described with reference to FIG. 2A. The segmentation result 236 indicates talker-homogenous audio segments (e.g., the talker-homogenous audio segment 111A and the talker-homogenous audio segment 111B) of the audio stream 141, as described with reference to FIG. 2A.

The method 1000 also includes performing a comparison of a plurality of user speech profiles to a first audio feature data set of a first plurality of audio feature data sets of a first talker-homogenous audio segment to determine whether the first audio feature data set matches any of the plurality of user speech profiles, at 1006. For example, the profile manager 126 of FIG. 1 performs a comparison of the plurality of user speech profiles 150 to an audio feature data set 252 of the one or more audio feature data sets 252A of the talker-homogenous audio segment 111A to determine whether the audio feature data set 252 matches any of the plurality of user speech profiles 150, as described with reference to FIG. 2B.

The method 1000 further includes, based on determining that the first audio feature data set does not match any of the plurality of user speech profiles: generating a first user speech profile based on the first plurality of audio feature data sets and adding the first user speech profile to the plurality of user speech profiles, at 1008. For example, the profile manager 126 of FIG. 1, based on determining that the audio feature data set 252 does not match any of the plurality of user speech profiles 150, generates a user speech profile 150C based on at least a subset of the one or more audio feature data sets 252A, and adds the user speech profile 150C to the plurality of user speech profiles 150, as described with reference to FIG. 2B.

The method 1000 enables generation of a user speech profile based on audio feature data sets of a talker-homogenous audio segment. Using multiple audio feature data sets corresponding to speech of the same talker improve accuracy of the user speech profile in representing the speech of the talker, as compared to generating the user speech profile based on a single audio feature data. Passive enrollment can be used to generate the user speech profile without user having to be pre-enrolled or having to speak pre-determined words or sentences.

The method 1000 of FIG. 10 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1000 of FIG. 10 may be performed by a processor that executes instructions, such as described with reference to FIG. 19.

Figure 11:
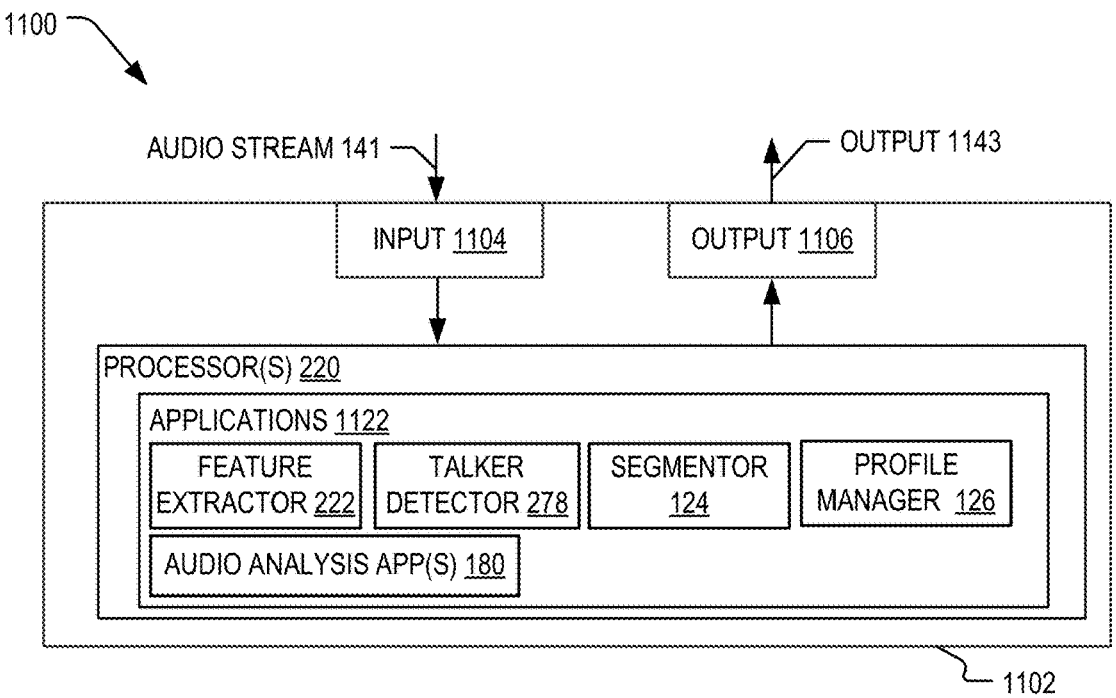
FIG. 11 illustrates an example of an integrated circuit operable to perform user speech profile management, in accordance with some examples of the present disclosure.
Figure 15:
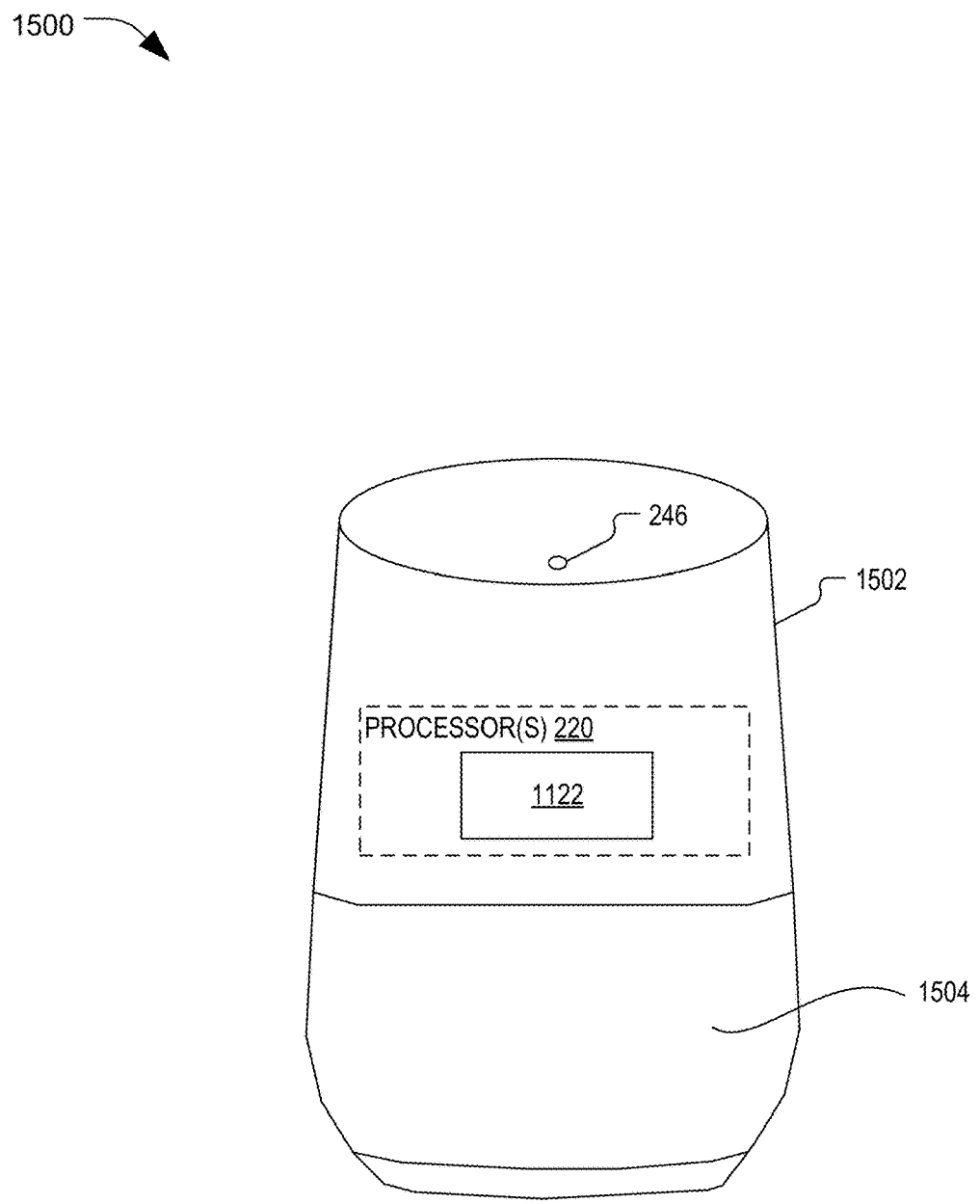
FIG. 15 is a diagram of a voice-controlled speaker system operable to perform user speech profile management, in accordance with some examples of the present disclosure.
Figure 16:
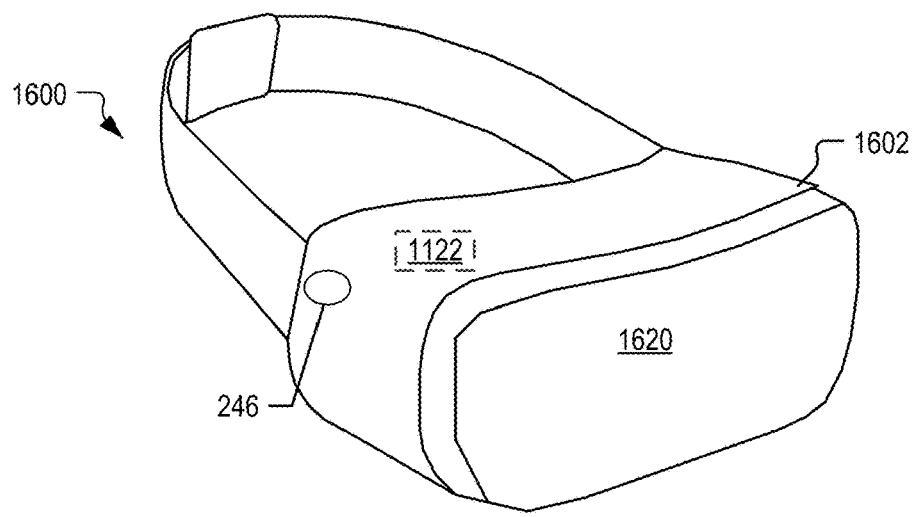
FIG. 16 is a diagram of a virtual reality or augmented reality headset, operable to perform user speech profile management, in accordance with some examples of the present disclosure.
Figure 17:
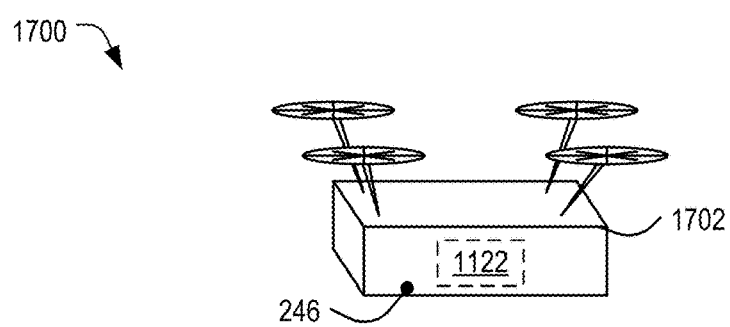
FIG. 17 is a diagram of a first example of a vehicle operable to perform user speech profile management, in accordance with some examples of the present disclosure.
Figure 18:
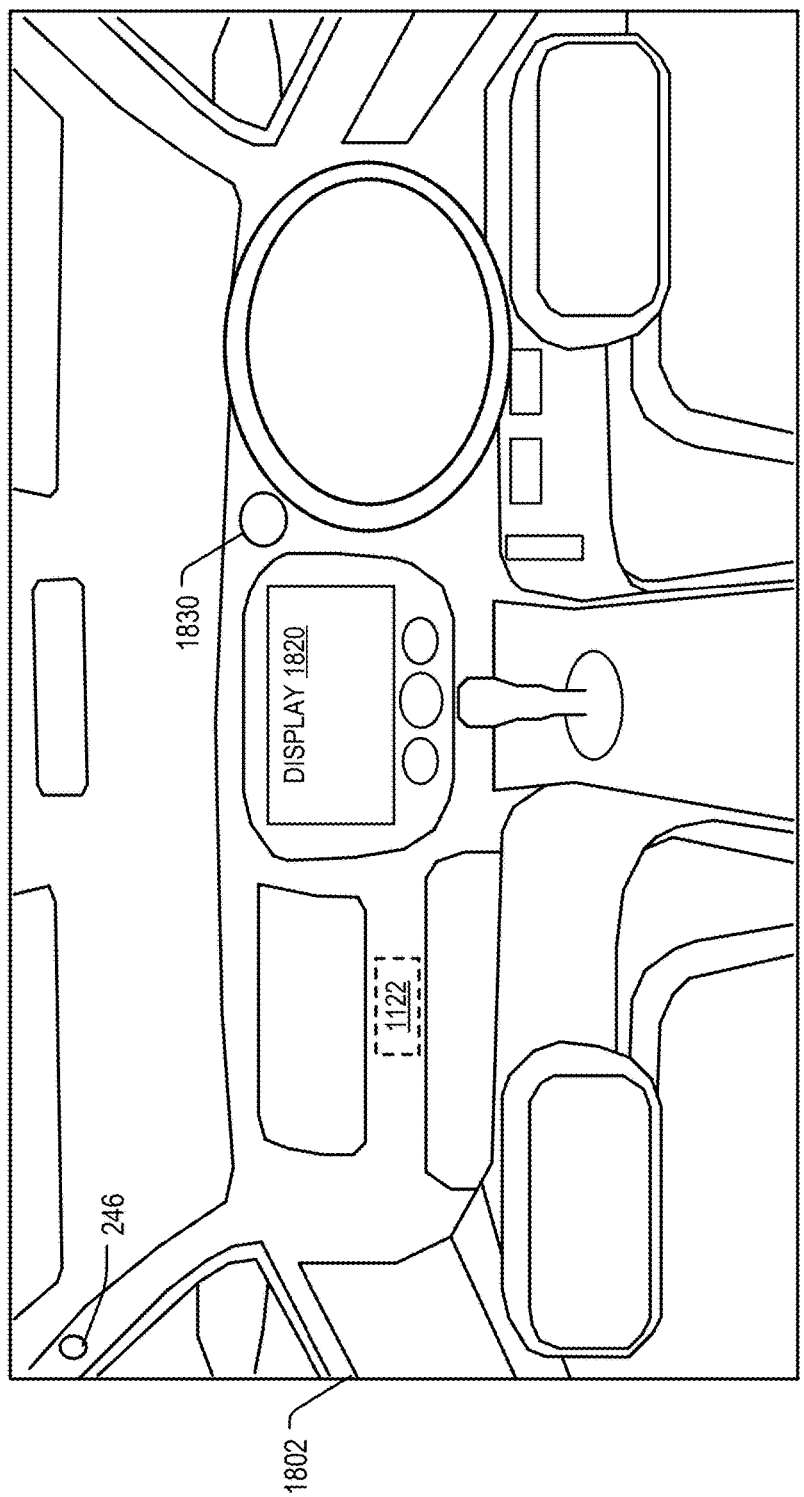
FIG. 18 is a diagram of a second example of a vehicle operable to perform user speech profile management, in accordance with some examples of the present disclosure.

FIG. 11 depicts an implementation 1100 of the device 202 as an integrated circuit 1102 that includes the one or more processors 220. The one or more processors 220 include a plurality of applications 1122. The applications 1122 include feature extractor 222, the talker detector 278, the segmentor 124, the profile manager 126, the profile manager 126, the one or more audio analysis applications 180, or a combination thereof. The integrated circuit 1102 also includes an audio input 1104, such as one or more bus interfaces, to enable the audio stream 141 to be received for processing. The integrated circuit 1102 also includes a signal output 1106, such as a bus interface, to enable sending of an output signal 1143, such as the profile ID 155. The integrated circuit 1102 enables implementation of user speech profile management as a component in a system that includes microphones, such as a mobile phone or tablet as depicted in FIG. 12, a headset as depicted in FIG. 13, a wearable electronic device as depicted in FIG. 14, a voice-controlled speaker system as depicted in FIG. 15, a virtual reality headset or an augmented reality headset as depicted in FIG. 16, or a vehicle as depicted in FIG. 17 or FIG. 18.

Figure 12:
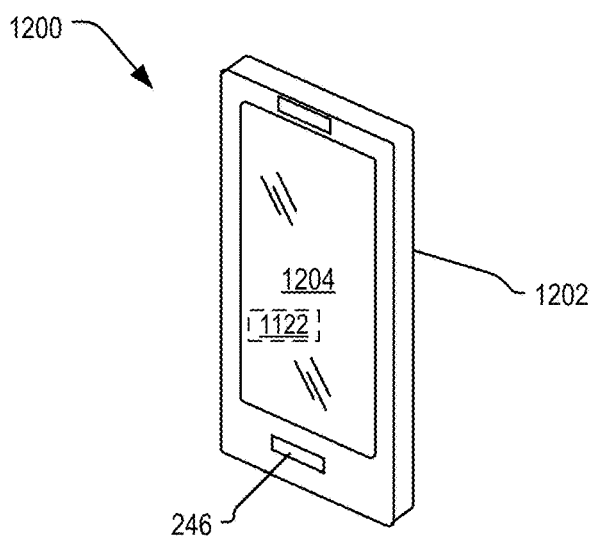
FIG. 12 is a diagram of a mobile device operable to perform user speech profile management, in accordance with some examples of the present disclosure.

FIG. 12 depicts an implementation 1200 in which the device 202 includes a mobile device 1202, such as a phone or tablet, as illustrative, non-limiting examples. The mobile device 1202 includes the microphone 246 and a display screen 1204. Components of the one or more processors 220, including the applications 1122, are integrated in the mobile device 1202 and are illustrated using dashed lines to indicate internal components that are not generally visible to a user of the mobile device 1202. In a particular example, the feature extractor 222, the segmentor 124, and the profile manager 126 of the applications 1122 operate to manage user speech profiles, which are then used to perform one or more operations at the mobile device 1202, such as to launch a graphical user interface or otherwise display other information (e.g., a conversation transcript) associated with the user's speech at the display screen 1204 (e.g., via an integrated "smart assistant" application).

Figure 13:
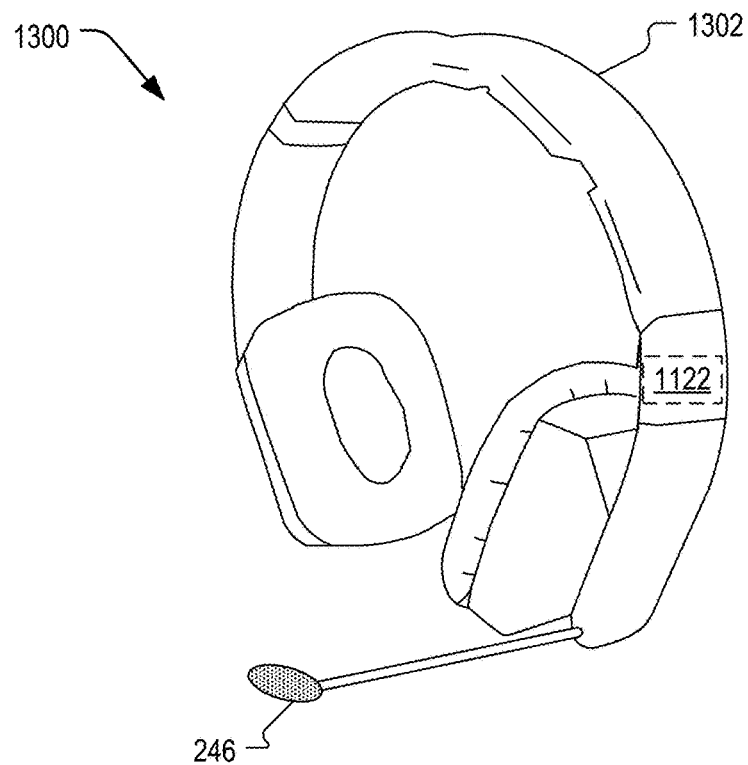
FIG. 13 is a diagram of a headset operable to perform user speech profile management, in accordance with some examples of the present disclosure.

FIG. 13 depicts an implementation 1300 in which the device 202 includes a headset device 1302. The headset device 1302 includes the microphone 246. Components of the one or more processors 220, including the applications 1122, are integrated in the headset device 1302. In a particular example, the feature extractor 222, the segmentor 124, and the profile manager 126 of the applications 1122 operate to manage user speech profiles, which may cause the headset device 1302 to perform one or more operations at the headset device 1302, such as to transmit information (e.g., the profile update data 272, the user interaction data 274, or both of FIG. 2B) corresponding to the user speech to a second device (not shown), for further processing, or a combination thereof.

Figure 14:
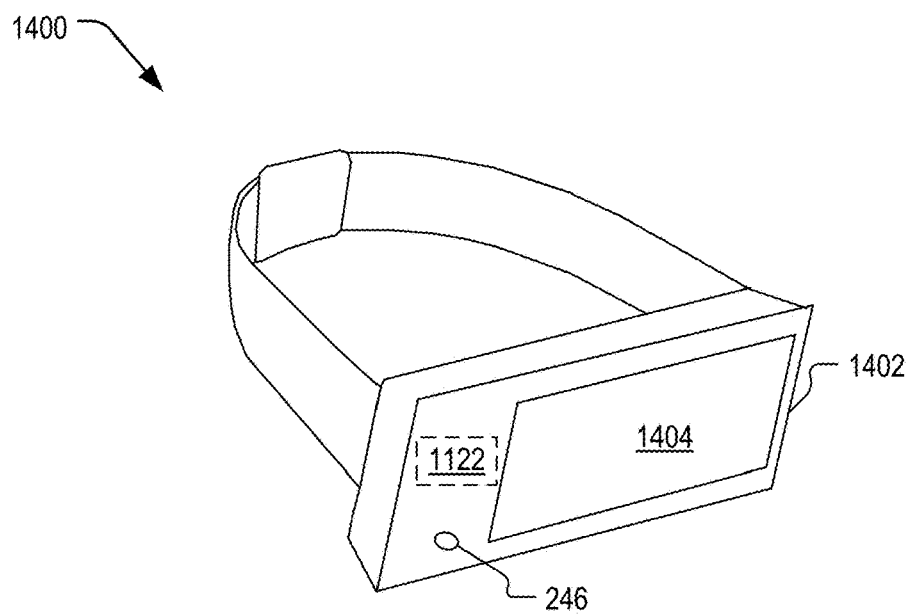
FIG. 14 is a diagram of a wearable electronic device operable to perform user speech profile management, in accordance with some examples of the present disclosure.

FIG. 14 depicts an implementation 1400 in which the device 202 includes a wearable electronic device 1402, illustrated as a "smart watch." The applications 1122 and the microphone 246 are integrated into the wearable electronic device 1402. In a particular example, the feature extractor 222, the segmentor 124, and the profile manager 126 of the applications 1122 operate to manage user speech profiles, which are then used to perform one or more operations at the wearable electronic device 1402, such as to launch a graphical user interface or otherwise display other information associated with the user's speech at a display screen 1404 of the wearable electronic device 1402. To illustrate, the wearable electronic device 1402 may include a display screen 1404 that is configured to display a notification (e.g., an option to add a calendar event) based on user speech detected by the wearable electronic device 1402. In a particular example, the wearable electronic device 1402 includes a haptic device that provides a haptic notification (e.g., vibrates) in response to detection of user speech. For example, the haptic notification can cause a user to look at the wearable electronic device 1402 to see a displayed notification indicating detection of a keyword spoken by the user. The wearable electronic device 1402 can thus alert a user with a hearing impairment or a user wearing a headset that the user's speech is detected. In a particular example, the wearable electronic device 1402 can display a transcript of a conversation in response to detection of speech.

FIG. 15 is an implementation 1500 in which the device 202 includes a wireless speaker and voice activated device 1502. The wireless speaker and voice activated device 1502 can have wireless network connectivity and is configured to execute an assistant operation. The one or more processors 220 including the applications 1122, the microphone 246, or a combination thereof, are included in the wireless speaker and voice activated device 1502. The wireless speaker and voice activated device 1502 also includes a speaker 1504. During operation, in response to receiving a verbal command identified as user speech of a user associated with a user speech profile 150A via operation of the feature extractor 222, the segmentor 124, and the profile manager 126 of the applications 1122, the wireless speaker and voice activated device 1502 can execute assistant operations, such as via execution of a voice activation system (e.g., an integrated assistant application). The assistant operations can include adjusting a temperature, playing music, turning on lights, etc. For example, the assistant operations are performed responsive to receiving a command after a keyword or key phrase (e.g., "hello assistant"). In a particular aspect, the assistant operations include performing a user-specific command (e.g., "set an appointment in my calendar for 2 PM tomorrow" or "increase heating in my room") for the user associated with the user speech profile 150A.

FIG. 16 depicts an implementation 1600 in which the device 202 includes a portable electronic device that corresponds to a virtual reality, augmented reality, or mixed reality headset 1602. The applications 1122, the microphone 246, or a combination thereof, are integrated into the headset 1602. A visual interface device 1620 is positioned in front of the user's eyes to enable display of augmented reality or virtual reality images or scenes to the user while the headset 1602 is worn. In a particular example, the visual interface device is configured to display a notification indicating user speech detected in an audio signal received from microphone 246. In a particular aspect, the visual interface device is configured to display a conversation transcript of a conversation picked up by the microphone 246.

FIG. 17 depicts an implementation 1700 in which the device 202 corresponds to, or is integrated within, a vehicle 1702, illustrated as a manned or unmanned aerial device (e.g., a package delivery drone). The applications 1122, the microphone 246, or a combination thereof, are integrated into the vehicle 1702. Speech analysis can be performed based on audio signals received from the microphone 246 of the vehicle 1702, such as for generating a transcript of a conversation captured by the microphone 246.

FIG. 18 depicts another implementation 1800 in which the device 202 corresponds to, or is integrated within, a vehicle 1802, illustrated as a car. The vehicle 1802 includes the one or more processors 220 including the applications 1122. The vehicle 1802 also includes the microphone 246. The microphone 246 is positioned to capture utterances of one or more passengers of the vehicle 1802. User speech analysis can be performed based on audio signals received from the microphone 246 of the vehicle 1802. In some implementations, user speech analysis can be performed based on an audio signal received from interior microphones (e.g., the microphone 246), such as a conversation between passengers of the vehicle 1802. For example, the user speech analysis can be used to set a calendar event for users associated with particular user speech profiles based on a conversation detected in the vehicle 1802 (e.g., "lets go on a picnic Saturday afternoon" and "sure, that'll be great"). In some implementations, user speech analysis can be performed based on an audio signal received from external microphones (e.g., the microphone 246), such as users speaking outside the vehicle 1802. In a particular implementation, in response to detecting a particular conversation between users associated with particular speech profiles, the applications 1122 initiates one or more operations of the vehicle 1802 based on the detected conversation, the detected users, or both, such as by providing feedback or information (e.g., "user 1 has a prior commitment on Saturday until 3 PM, schedule picnic for 4 PM?") via a display 1820 or one or more speakers (e.g., a speaker 1830).

Figure 19:
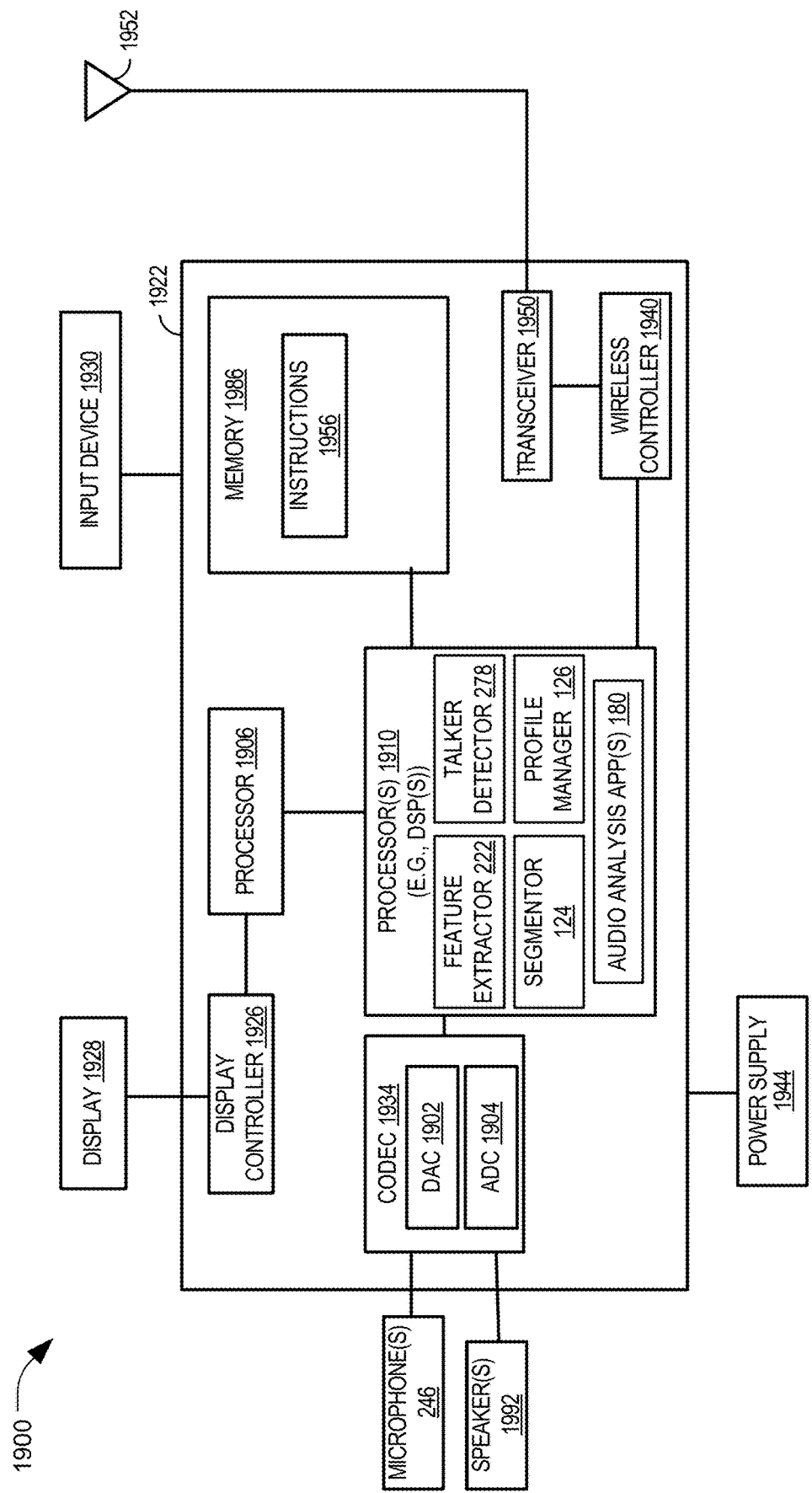
FIG. 19 is a block diagram of a particular illustrative example of a device that is operable to perform user speech profile management, in accordance with some examples of the present disclosure.

Referring to FIG. 19, a block diagram of a particular illustrative implementation of a device is depicted and generally designated 1900. In various implementations, the device 1900 may have more or fewer components than illustrated in FIG. 19. In an illustrative implementation, the device 1900 may correspond to the device 202. In an illustrative implementation, the device 1900 may perform one or more operations described with reference to FIGS. 1-18.

In a particular implementation, the device 1900 includes a processor 1906 (e.g., a central processing unit (CPU)). The device 1900 may include one or more additional processors 1910 (e.g., one or more DSPs). In a particular aspect, the one or more processors 220 of FIG. 2A correspond to the processor 1906, the processors 1910, or a combination thereof. The processors 1910 may include the feature extractor 222, the talker detector 278, the segmentor 124, the profile manager 126, the one or more audio analysis applications 180, or a combination thereof.

The device 1900 may include a memory 1986 and a CODEC 1934. In a particular aspect, the memory 1986 corresponds to the memory 232 of FIG. 2A. The memory 1986 may include instructions 1956, that are executable by the one or more additional processors 1910 (or the processor 1906) to implement the functionality described with reference to the feature extractor 222, the talker detector 278, the segmentor 124, the profile manager 126, the one or more audio analysis applications 180, or a combination thereof. The device 1900 may include a wireless controller 2841940 coupled, via a transceiver 1950, to an antenna 1952. In a particular aspect, the device 1900 includes a modem coupled to the transceiver 1950.

The device 1900 may include a display 1928 coupled to a display controller 1926. One or more speakers 1992, the microphone 246, or a combination thereof, may be coupled to the CODEC 1934. The CODEC 1934 may include a digital-to-analog converter (DAC) 1902, an analog-to-digital converter (ADC) 1904, or both. In a particular implementation, the CODEC 1934 may receive analog signals from the microphone 246, convert the analog signals to digital signals using the analog-to-digital converter 1904, and provide the digital signals to the one or more processors 1910. The one or more processors 1910 may process the digital signals. In a particular implementation, the one or more processors 1910 may provide digital signals to the CODEC 1934. The CODEC 1934 may convert the digital signals to analog signals using the digital-to-analog converter 1902 and may provide the analog signals to the speaker 1992.

In a particular implementation, the device 1900 may be included in a system-in-package or system-on-chip device 1922. In a particular implementation, the memory 1986, the processor 1906, the processors 1910, the display controller 1926, the CODEC 1934, the wireless controller 2841940, and the transceiver 1950 are included in a system-in-package or system-on-chip device 1922. In a particular implementation, an input device 1930 and a power supply 1944 are coupled to the system-on-chip device 1922. Moreover, in a particular implementation, as illustrated in FIG. 19, the display 1928, the input device 1930, the speaker 1992, the microphone 246, the antenna 1952, and the power supply 1944 are external to the system-on-chip device 1922. In a particular implementation, each of the display 1928, the input device 1930, the speaker 1992, the microphone 246, the antenna 1952, and the power supply 1944 may be coupled to a component of the system-on-chip device 1922, such as an interface or a controller.

The device 1900 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for storing a plurality of user speech profiles of a plurality of users. For example, the means for storing include the memory 232, the device 202, the system 200 of FIG. 2A, the memory 1986, the device 1900, one or more other circuits or components configured to store a plurality of user speech profiles, or any combination thereof.

The apparatus further includes means for determining in a first power mode whether an audio stream corresponds to speech of at least two distinct talkers. For example, the means for determining include the talker detector 278, the one or more processors 220, the device 202, the system 200 of FIG. 2A, the processor 1906, the one or more processors 1910, the device 1900, one or more other circuits or components configured to determine in a first power mode whether an audio stream corresponds to speech of at least two distinct talkers, or any combination thereof.

The apparatus also includes means for analyzing audio feature data of the audio stream to generate a segmentation result. For example, the means for analyzing include the segmentor 124, the one or more processors 220, the device 202, the system 200 of FIG. 2A, the processor 1906, the one or more processors 1910, the device 1900, one or more other circuits or components configured to analyze audio feature data, or any combination thereof. The segmentation result 236 indicates talker-homogenous audio segments of the audio stream 141.

The apparatus further includes means for performing a comparison of the plurality of user speech profiles to a first audio feature data set of a first plurality of audio feature data sets of a first talker-homogenous audio segment to determine whether the first audio feature data set matches any of the plurality of user speech profiles. For example, the means for performing the comparison include the profile manager 126, the one or more processors 220, the device 202, the system 200 of FIG. 2A, the processor 1906, the one or more processors 1910, the device 1900, one or more other circuits or components configured to perform the comparison, or any combination thereof.

The apparatus also includes means for generating a first user speech profile based on the first plurality of audio feature data sets. For example, the means for generating the first user speech profile include the profile manager 126, the one or more processors 220, the device 202, the system 200 of FIG. 2A, the processor 1906, the one or more processors 1910, the device 1900, one or more other circuits or components configured to generate the first user speech profile, or any combination thereof. The user speech profile 150A is generated based on determining that the audio feature data set 252 does not match any of the plurality of user speech profiles 150.

The apparatus further includes means for adding the first user speech profile to the plurality of user speech profiles. For example, the means for adding the first user speech profile include the profile manager 126, the one or more processors 220, the device 202, the system 200 of FIG. 2A, the processor 1906, the one or more processors 1910, the device 1900, one or more other circuits or components configured to add the first user speech profile, or any combination thereof.

In some implementations, a non-transitory computer-readable medium (e.g., a computer-readable storage device, such as the memory 1986) includes instructions (e.g., the instructions 1956) that, when executed by one or more processors (e.g., the one or more processors 1910 or the processor 1906), cause the one or more processors to determine, in a first power mode (e.g., the power mode 282), whether an audio stream (e.g., the audio stream 141) corresponds to speech of at least two distinct talkers. The instructions, when executed by the one or more processors, also cause the processors to analyze audio feature data (e.g., the audio feature data sets 252) of the audio stream to generate a segmentation result (e.g., the segmentation result 236). The segmentation result indicates talker-homogenous audio segments (e.g., the talker-homogenous audio segment 111A and the talker-homogenous audio segment 111B) of the audio stream. The instructions, when executed by the one or more processors, also cause the processors to perform a comparison of a plurality of user speech profiles (e.g., the plurality of user speech profiles 150) to a first audio feature data set (e.g., the audio feature data set 252) of a first plurality of audio feature data sets (e.g., the audio feature data sets 252A) of a first talker-homogenous audio segment (e.g., the talker-homogenous audio segment 111A) to determine whether the first audio feature data set matches any of the plurality of user speech profiles. The instructions, when executed by the one or more processors, further cause the processors to, based on determining that the first audio feature data set does not match any of the plurality of user speech profiles: generate a first user speech profile (e.g., the user speech profile 150A) based on the first plurality of audio feature data sets, and add the first user speech profile to the plurality of user speech profiles.

Particular aspects of the disclosure are described below in a first set of interrelated clauses:

According to Clause 1. A device for audio analysis comprises: a memory configured to store a plurality of user speech profiles of a plurality of users; and one or more processors configured to: determine, in a first power mode, whether an audio stream corresponds to speech of at least two distinct talkers; based on determining that the audio stream corresponds to speech of at least two distinct talkers, analyze, in a second power mode, audio feature data of the audio stream to generate a segmentation result, the segmentation result indicating talker-homogenous audio segments of the audio stream; perform a comparison of the plurality of user speech profiles to a first audio feature data set of a first plurality of audio feature data sets of a first talker-homogenous audio segment to determine whether the first audio feature data set matches any of the plurality of user speech profiles; and based on determining that the first audio feature data set does not match any of the plurality of user speech profiles: generate a first user speech profile based on the first plurality of audio feature data sets; and add the first user speech profile to the plurality of user speech profiles.

Clause 2 includes the device of Clause 1, wherein the first audio feature data set includes a first audio feature vector.

Clause 3 includes the device of Clause 1 or Clause 2, wherein the one or more processors are configured to analyze the audio feature data by applying a speaker segmentation neural network to the audio feature data.

Clause 4 includes the device of any of the Clauses 1 to 3, wherein the one or more processors are configured to, based on determining that the segmentation result indicates that the first audio feature data set corresponds to speech of a first talker and that the first audio feature data set does not match any of the plurality of user speech profiles: store the first audio feature data set in a first enrollment buffer associated with the first talker; and store subsequent audio feature data sets corresponding to speech of the first talker in the first enrollment buffer until a stop condition is satisfied, wherein the first plurality of audio feature data sets of the first talker-homogenous audio segment includes the first audio feature data set and the subsequent audio feature data sets.

Clause 5 includes the device of Clause 4, wherein the one or more processors are configured to determine that the stop condition is satisfied in response to determining that longer than threshold silence is detected in the audio stream.

Clause 6 includes the device of any of the Clauses 4 to 5, wherein the one or more processors are configured to add a particular audio feature data set to the first enrollment buffer based at least in part on determining that the particular audio feature data set corresponds to speech of a single talker, wherein the single talker includes the first talker.

Clause 7 includes the device of any of the Clauses 1 to 6, wherein the one or more processors are configured to, based on determining that a count of the first plurality of audio feature data sets of the first talker-homogenous audio segment stored in a first enrollment buffer is greater than an enrollment threshold, generate the first user speech profile based on the first plurality of audio feature data sets.

Clause 8 includes the device of any of the Clauses 1 to 7, wherein the one or more processors are configured to, based on determining that the first audio feature data set matches a particular user speech profile, update the particular user speech profile based on the first audio feature data set.

Clause 9 includes the device of Clause 8, wherein the one or more processors are configured to, based at least in part on determining that the first audio feature data set corresponds to speech of a single talker, update the particular user speech profile based on the first audio feature data set.

Clause 10 includes the device of any of the Clauses 1 to 9, wherein the one or more processors are configured to determine whether a second audio feature data set of a second plurality of audio feature data sets of a second talker-homogenous audio segment matches any of the plurality of user speech profiles.

Clause 11 includes the device of Clause 10, wherein the one or more processors are configured to, based on determining that the second audio feature data set does not match any of the plurality of user speech profiles: generate a second user speech profile based on the second plurality of audio feature data sets; and add the second user speech profile to the plurality of user speech profiles.

Clause 12 includes the device of Clause 10, wherein the one or more processors are configured to, based on determining that the second audio feature data set matches a particular user speech profile of the plurality of user speech profiles, update the particular user speech profile based on the second audio feature data set.

Clause 13 includes the device of any of the Clauses 1 to 12, wherein the memory is configured to store profile update data, and wherein the one or more processors are configured to: in response to generating the first user speech profile, update the profile update data to indicate that the first user speech profile is updated; and based on determining that the profile update data indicates that a first count of the plurality of user speech profiles have been updated, output the first count as a count of talkers detected in the audio stream.

Clause 14 includes the device of any of the Clauses 1 to 13, wherein the memory is configured to store user interaction data, and wherein the one or more processors are configured to: in response to generating the first user speech profile, update the user interaction data based on a speech duration of the first talker-homogenous audio segment to indicate that a first user associated with the first user speech profile interacted for the speech duration; and output at least the user interaction data.

Clause 15 includes the device of any of the Clauses 1 to 14, wherein the first power mode is a lower power mode as compared to the second power mode.

Clause 16 includes the device of Clause 1, wherein the one or more processors are configured to: determine, in the first power mode, audio information of the audio stream, the audio information including a count of talkers detected in the audio stream, voice activity detection (VAD) information, or both; activate one or more audio analysis applications in the second power mode; and provide the audio information to the one or more audio analysis applications.

Clause 17 includes the device of any of the Clauses 1 to 16, wherein the one or more processors are configured to, in response to determining that the segmentation result indicates that one or more second audio segments of the audio stream correspond to multiple talkers, refrain from updating the plurality of user speech profiles based on the one or more second audio segments.

Particular aspects of the disclosure are described below in a second set of interrelated clauses:

According to Clause 18, a method of audio analysis comprises: determining, in a first power mode at a device, whether an audio stream corresponds to speech of at least two distinct talkers; based on determining that the audio stream corresponds to speech of at least two distinct talkers, analyzing, in a second power mode audio feature data of the audio stream to generate a segmentation result, the segmentation result indicating talker-homogenous audio segments of the audio stream; performing, at the device, a comparison of a plurality of user speech profiles to a first audio feature data set of a first plurality of audio feature data sets of a first talker-homogenous audio segment to determine whether the first audio feature data set matches any of the plurality of user speech profiles; and based on determining that the first audio feature data set does not match any of the plurality of user speech profiles: generating, at the device, a first user speech profile based on the first plurality of audio feature data sets; and adding, at the device, the first user speech profile to the plurality of user speech profiles.

Clause 19 includes the method of Clause 18, and further comprises applying a speaker segmentation neural network to the audio feature data.

Clause 20 includes the method of Clause 18 or Clause 19, and further comprises, based on determining that the segmentation result indicates that the first audio feature data set corresponds to speech of a first talker and that the first audio feature data set does not match any of the plurality of user speech profiles: storing the first audio feature data set in a first enrollment buffer associated with the first talker; and storing subsequent audio feature data sets corresponding to speech of the first talker in the first enrollment buffer until a stop condition is satisfied, wherein the first plurality of audio feature data sets of the first talker-homogenous audio segment includes the first audio feature data set and the subsequent audio feature data sets.

Clause 21 includes the method of Clause 20, and further comprises determining, at the device, that the stop condition is satisfied in response to determining that longer than threshold silence is detected in the audio stream.

Clause 22 includes the method of Clause 20 or Clause 21, and further comprises adding, at the device, a particular audio feature data set to the first enrollment buffer based at least in part on determining that the particular audio feature data set corresponds to speech of a single talker, wherein the single talker includes the first talker.

Clause 23 includes the method of any of Clauses 18 to 22, and further comprises, based on determining that a count of the first plurality of audio feature data sets of the first talker-homogenous audio segment stored in a first enrollment buffer is greater than an enrollment threshold, generating the first user speech profile based on the first plurality of audio feature data sets.

Clause 24 includes the method of any of Clauses 18 to 23, and further comprises, based on determining that the first audio feature data set matches a particular user speech profile, updating the particular user speech profile based on the first audio feature data set.

Clause 25 includes the method of Clause 24, and further comprises, based at least in part on determining that the first audio feature data set corresponds to speech of a single talker, updating the particular user speech profile based on the first audio feature data set.

Clause 26 includes the method of any of Clauses 18 to 25, and further comprises, based on determining that a second audio feature data set of a second plurality of audio feature data sets of a second talker-homogenous audio segment matches a particular user speech profile of the plurality of user speech profiles, updating the particular user speech profile based on the second audio feature data set.

Particular aspects of the disclosure are described below in a third set of interrelated clauses:

According to Clause 27, a non-transitory computer-readable storage medium stores instructions that, when executed by one or more processors, cause the processors to: determine, in a first power mode, whether an audio stream corresponds to speech of at least two distinct talkers; based on determining that the audio stream corresponds to speech of at least two distinct talkers, analyze, in a second power mode, audio feature data of the audio stream to generate a segmentation result, the segmentation result indicating talker-homogenous audio segments of the audio stream; perform a comparison of a plurality of user speech profiles to a first audio feature data set of a first plurality of audio feature data sets of a first talker-homogenous audio segment to determine whether the first audio feature data set matches any of the plurality of user speech profiles; and based on determining that the first audio feature data set does not match any of the plurality of user speech profiles: generate a first user speech profile based on the first plurality of audio feature data sets; and add the first user speech profile to the plurality of user speech profiles.

Clause 28 includes the non-transitory computer-readable storage medium of Clause 27, wherein the instructions, when executed by the one or more processors, cause the processors to, based on determining that a count of the first plurality of audio feature data sets of the first talker-homogenous audio segment stored in a first enrollment buffer is greater than an enrollment threshold, generate the first user speech profile based on the first plurality of audio feature data sets.

Particular aspects of the disclosure are described below in a fourth set of interrelated clauses:

According to Clause 29, an apparatus comprises: means for storing a plurality of user speech profiles of a plurality of users; means for determining in a first power mode whether an audio stream corresponds to speech of at least two distinct talkers; means for analyzing in a second power mode audio feature data of the audio stream to generate a segmentation result, the audio feature data analyzed in the second power mode based on determining that the audio stream corresponds to speech of at least two distinct talkers, wherein the segmentation result indicates talker-homogenous audio segments of the audio stream; means for performing a comparison of the plurality of user speech profiles to a first audio feature data set of a first plurality of audio feature data sets of a first talker-homogenous audio segment to determine whether the first audio feature data set matches any of the plurality of user speech profiles; means for generating a first user speech profile based on the first plurality of audio feature data sets, the first user speech profile generated based on determining that the first audio feature data set does not match any of the plurality of user speech profiles; and means for adding the first user speech profile to the plurality of user speech profiles.

Clause 30 includes the apparatus of Clause 29, wherein the means for storing, the means for determining, the means for analyzing, the means for performing, the means for generating, and the means for adding are integrated into at least one of a mobile communication device, a smart phone, a cellular phone, a smart speaker, a speaker bar, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device for audio analysis comprising:
   a memory configured to store a plurality of user speech profiles of a plurality of users; and
   one or more processors configured to:
      determine, in a first power mode, whether an audio stream corresponds to speech of at least two distinct talkers;
      based on determining that the audio stream corresponds to speech of at least two distinct talkers, analyze, in a second power mode, audio feature data of the audio stream to generate a segmentation result using one or more machine-learning segmentation models that are trained to perform speaker segmentation, the segmentation result indicating talker-homogenous audio segments of the audio stream;
      perform a comparison of the plurality of user speech profiles to a first audio feature data set of a first plurality of audio feature data sets of a first talker-homogenous audio segment to determine whether the first audio feature data set matches any of the plurality of user speech profiles; and
      based on determining that the first audio feature data set does not match any of the plurality of user speech profiles:
         store the first audio feature data set in a first enrollment buffer associated with a first talker;
         store subsequent audio feature data sets corresponding to speech of the first talker in the first enrollment buffer until a stop condition is satisfied, wherein the first plurality of audio feature data sets of the first talker-homogenous audio segment includes the first audio feature data set and the subsequent audio feature data sets;
         generate a first user speech profile based on the first plurality of audio feature data sets; and
         add the first user speech profile to the plurality of user speech profiles.

2. The device of claim 1, wherein the first audio feature data set includes a first audio feature vector.

3. The device of claim 1, wherein the one or more processors are configured to analyze the audio feature data by applying a speaker segmentation neural network to the audio feature data.

4. The device of claim 1, wherein the one or more processors are configured to determine that the stop condition is satisfied in response to determining that longer than threshold silence is detected in the audio stream.

5. The device of claim 1, wherein the one or more processors are configured to add a particular audio feature data set to the first enrollment buffer based at least in part on determining that the particular audio feature data set corresponds to speech of a single talker, wherein the single talker includes the first talker.

6. The device of claim 1, wherein the one or more processors are configured to, based on determining that a count of the first plurality of audio feature data sets of the first talker-homogenous audio segment stored in the first enrollment buffer is greater than an enrollment threshold, generate the first user speech profile based on the first plurality of audio feature data sets.

7. The device of claim 1, wherein the one or more processors are configured to, based on determining that the first audio feature data set matches a particular user speech profile, update the particular user speech profile based on the first audio feature data set.

8. The device of claim 7, wherein the one or more processors are configured to, based at least in part on determining that the first audio feature data set corresponds to speech of a single talker, update the particular user speech profile based on the first audio feature data set.

9. The device of claim 1, wherein the one or more processors are configured to determine whether a second audio feature data set of a second plurality of audio feature data sets of a second talker-homogenous audio segment matches any of the plurality of user speech profiles.

10. The device of claim 9, wherein the one or more processors are configured to, based on determining that the second audio feature data set does not match any of the plurality of user speech profiles:
generate a second user speech profile based on the second plurality of audio feature data sets; and
add the second user speech profile to the plurality of user speech profiles.

11. The device of claim 9, wherein the one or more processors are configured to, based on determining that the second audio feature data set matches a particular user speech profile of the plurality of user speech profiles, update the particular user speech profile based on the second audio feature data set.

12. The device of claim 1, wherein the memory is configured to store profile update data, and wherein the one or more processors are configured to:
in response to generating the first user speech profile, update the profile update data to indicate that the first user speech profile is updated; and
based on determining that the profile update data indicates that a first count of the plurality of user speech profiles have been updated, output the first count as a count of talkers detected in the audio stream.

13. The device of claim 1, wherein the memory is configured to store user interaction data, and wherein the one or more processors are configured to:
in response to generating the first user speech profile, update the user interaction data based on a speech duration of the first talker-homogenous audio segment to indicate that a first user associated with the first user speech profile interacted for the speech duration; and
output at least the user interaction data.

14. The device of claim 1, wherein the first power mode is a lower power mode as compared to the second power mode.

15. The device of claim 1, wherein the one or more processors are configured to:
determine, in the first power mode, audio information of the audio stream, the audio information including a count of talkers detected in the audio stream, voice activity detection (VAD) information, or both;
activate one or more audio analysis applications in the second power mode; and
provide the audio information to one or more audio analysis applications.

16. The device of claim 1, wherein the one or more processors are configured to, in response to determining that the segmentation result indicates that one or more second audio segments of the audio stream correspond to multiple talkers, refrain from updating the plurality of user speech profiles based on the one or more second audio segments.

17. A method of audio analysis comprising:
determining, in a first power mode at a device, whether an audio stream corresponds to speech of at least two distinct talkers;
based on determining that the audio stream corresponds to speech of at least two distinct talkers, analyzing, in a second power mode, audio feature data of the audio stream to generate a segmentation result using one or more machine-learning segmentation models that are trained to perform speaker segmentation, the segmentation result indicating talker-homogenous audio segments of the audio stream;
performing, at the device, a comparison of a plurality of user speech profiles to a first audio feature data set of a first plurality of audio feature data sets of a first talker-homogenous audio segment to determine whether the first audio feature data set matches any of the plurality of user speech profiles; and
based on determining that the first audio feature data set does not match any of the plurality of user speech profiles:
storing the first audio feature data set in a first enrollment buffer associated with a first talker;
storing subsequent audio feature data sets corresponding to speech of the first talker in the first enrollment buffer until a stop condition is satisfied, wherein the first plurality of audio feature data sets of the first talker-homogenous audio segment includes the first audio feature data set and the subsequent audio feature data sets;
generating, at the device, a first user speech profile based on the first plurality of audio feature data sets; and
adding, at the device, the first user speech profile to the plurality of user speech profiles.

18. The method of claim 17, wherein the one or more machine-learning segmentation models include a speaker segmentation neural network.

19. The method of claim 17, further comprising determining, at the device, that the stop condition is satisfied in response to determining that longer than threshold silence is detected in the audio stream.

20. The method of claim 17, further comprising adding, at the device, a particular audio feature data set to the first enrollment buffer based at least in part on determining that the particular audio feature data set corresponds to speech of a single talker, wherein the single talker includes the first talker.

21. The method of claim 17, further comprising, based on determining that a count of the first plurality of audio feature data sets of the first talker-homogenous audio segment stored in the first enrollment buffer is greater than an enrollment threshold, generating the first user speech profile based on the first plurality of audio feature data sets.

22. The method of claim 17, further comprising, based on determining that the first audio feature data set matches a particular user speech profile, updating the particular user speech profile based on the first audio feature data set.

23. The method of claim 22, further comprising, based at least in part on determining that the first audio feature data set corresponds to speech of a single talker, updating the particular user speech profile based on the first audio feature data set.

24. The method of claim 17, further comprising, based on determining that a second audio feature data set of a second plurality of audio feature data sets of a second talker-homogenous audio segment matches a particular user speech profile of the plurality of user speech profiles, updating the particular user speech profile based on the second audio feature data set.

25. A non-transitory computer-readable storage medium storing instructions that, when executed by one or more processors, cause the one or more processors to:
determine, in a first power mode, whether an audio stream corresponds to speech of at least two distinct talkers;

based on determining that the audio stream corresponds to speech of at least two distinct talkers, analyze, in a second power mode, audio feature data of the audio stream to generate a segmentation result using one or more machine-learning segmentation models that are trained to perform speaker segmentation, the segmentation result indicating talker-homogenous audio segments of the audio stream;

perform a comparison of a plurality of user speech profiles to a first audio feature data set of a first plurality of audio feature data sets of a first talker-homogenous audio segment to determine whether the first audio feature data set matches any of the plurality of user speech profiles; and based on determining that the first audio feature data set does not match any of the plurality of user speech profiles:
store the first audio feature data set in a first enrollment buffer associated with a first talker;
store subsequent audio feature data sets corresponding to speech of the first talker in the first enrollment buffer until a stop condition is satisfied, wherein the first plurality of audio feature data sets of the first talker-homogenous audio segment includes the first audio feature data set and the subsequent audio feature data sets;
generate a first user speech profile based on the first plurality of audio feature data sets; and
add the first user speech profile to the plurality of user speech profiles.

26. The non-transitory computer-readable storage medium of claim 25, wherein the one or more machine-learning segmentation models include a speaker segmentation neural network.

27. The non-transitory computer-readable storage medium of claim 25, wherein the instructions, when executed by the one or more processors, cause the one or more processors to, based on determining that a count of the first plurality of audio feature data sets of the first talker-homogenous audio segment stored in the first enrollment buffer is greater than an enrollment threshold, generate the first user speech profile based on the first plurality of audio feature data sets.

28. An apparatus comprising:
means for storing a plurality of user speech profiles of a plurality of users;
means for determining in a first power mode whether an audio stream corresponds to speech of at least two distinct talkers;
means for analyzing in a second power mode audio feature data of the audio stream to generate a segmentation result using one or more machine-learning segmentation models that are trained to perform speaker segmentation, the audio feature data analyzed in the second power mode based on determining that the audio stream corresponds to speech of at least two distinct talkers, wherein the segmentation result indicates talker-homogenous audio segments of the audio stream;
means for performing a comparison of the plurality of user speech profiles to a first audio feature data set of a first plurality of audio feature data sets of a first talker-homogenous audio segment to determine whether the first audio feature data set matches any of the plurality of user speech profiles;
means for storing the first audio feature data set in a first enrollment buffer associated with a first talker;
means for storing subsequent audio feature data sets corresponding to speech of the first talker in the first enrollment buffer until a stop condition is satisfied, wherein the first plurality of audio feature data sets of the first talker-homogenous audio segment includes the first audio feature data set and the subsequent audio feature data sets;
means for generating a first user speech profile based on the first plurality of audio feature data sets, the first user speech profile generated based on determining that the first audio feature data set does not match any of the plurality of user speech profiles; and
means for adding the first user speech profile to the plurality of user speech profiles.

29. The method apparatus of claim 28, where the one or more machine-learning segmentation models include a speaker segmentation neural network.

30. The apparatus of claim 28, wherein the means for storing, the means for determining, the means for analyzing, the means for performing, the means for generating, and the means for adding are integrated into at least one of a mobile communication device, a smart phone, a cellular phone, a smart speaker, a speaker bar, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a virtual reality headset, an aerial vehicle, a home automation system, a voice-activated device, a wireless speaker and a voice activated device, a portable electronic device, a car, a computing device, a communication device, an internet-of-things (IoT) device, a virtual reality (VR) device, a base station, a mobile device, or any combination thereof.

* * * * *